(12) United States Patent
Luo et al.

(10) Patent No.: US 12,267,706 B2
(45) Date of Patent: Apr. 1, 2025

(54) MEASUREMENT REPORT TECHNIQUES FOR WIRELESS COMMUNICATIONS SYSTEMS

(71) Applicant: QUALCOMM Incorporated, San Diego, CA (US)

(72) Inventors: Jianghong Luo, Skillman, NJ (US); Navid Abedini, Basking Ridge, NJ (US); Tao Luo, San Diego, CA (US); Luca Blessent, Whitehouse Station, NJ (US); Karl Georg Hampel, Hoboken, NJ (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 232 days.

(21) Appl. No.: 17/156,208

(22) Filed: Jan. 22, 2021

(65) Prior Publication Data

US 2021/0227411 A1     Jul. 22, 2021

Related U.S. Application Data

(60) Provisional application No. 62/964,244, filed on Jan. 22, 2020.

(51) Int. Cl.
| | |
|---|---|
| *H04W 24/08* | (2009.01) |
| *H04W 24/10* | (2009.01) |
| *H04W 76/10* | (2018.01) |

(52) U.S. Cl.
CPC ........... *H04W 24/08* (2013.01); *H04W 24/10* (2013.01); *H04W 76/10* (2018.02)

(58) Field of Classification Search
CPC ..... H04W 24/08; H04W 24/10; H04W 76/10; H04W 72/082; H04W 84/047; H04W 24/02; H04B 7/022; H04B 7/0617
See application file for complete search history.

(56) References Cited

U.S. PATENT DOCUMENTS

| | | | |
|---|---|---|---|
| 2017/0188256 A1* | 6/2017 | Wang | .................. H04B 17/318 |
| 2018/0124796 A1 | 5/2018 | Noh et al. | |

(Continued)

FOREIGN PATENT DOCUMENTS

CN         110536350 A      12/2019

OTHER PUBLICATIONS

"AT&T: Enhancements to support NR backhaul links, 3GPP Draft; R1-1812859, 3rd Generation Partnership Project (3GPP), Mobile Competence Centre; 650, Route des Lucioles, F-06921 Sophia-Antipolis Cedex; France; Oct. 8-12, 2018" (Year: 2018).*

(Continued)

*Primary Examiner* — Walli Z Butt
*Assistant Examiner* — Thad N Defauw
(74) *Attorney, Agent, or Firm* — Holland & Hart LLP

(57) ABSTRACT

Methods, systems, and devices for wireless communications at a first wireless node in a wireless communications system are described. The techniques may enable a first wireless node (e.g., an integrated access and backhaul (IAB) node in an IAB system) to establish a communications link with a second wireless node. The first wireless node may receive, via a reception beam of the first wireless node, an interfering signal from an aggressor wireless node. The first wireless node may perform an interference measurement of the interfering signal at the first reception beam. The first wireless node may transmit a report indicating the interference measurement to the second wireless node. The second wireless node may schedule communications based on the interference measurement. In some examples, the report may indicate one or more parameters of the interfering signal. In some examples, the report may correspond to one or more beams.

29 Claims, 11 Drawing Sheets

(56) References Cited

U.S. PATENT DOCUMENTS

| | | | |
|---|---|---|---|
| 2019/0306765 A1 | 10/2019 | Cirik et al. | |
| 2020/0029262 A1* | 1/2020 | Kim | H04W 24/10 |
| 2020/0178130 A1* | 6/2020 | Pakniat | H04L 5/0048 |
| 2022/0158784 A1* | 5/2022 | Jiang | H04W 72/085 |

OTHER PUBLICATIONS

"Samsung: Interference Measurement Table and Beam Coordination", 3GPP Draft; R1-1716039-Interference Measurement Table and Beam Coordination, 3rd Generation Partnership Project (3GPP), Mobile Competence Centre; 650, Route Des Lucioles; F-06921 Sophia-Antipolis CE, Sep. 18-21, 2017 (Year: 2017).*

AT&T: "Enhancements to Support NR Backhaul Links", 3GPP Draft, 3GPP TSG RAN WG1 Meeting #95, R1-1812859, 3rd Generation Partnership Project (3GPP), Mobile Competence Centre, 650, Route Des Lucioles, F-06921 Sophia-Antipolis Cedex, France, vol. RAN WG1, No. Chengdu, China, Oct. 8, 2018-Oct. 12, 2018, Nov. 11, 2018 (Nov. 11, 2018), XP051554822, 13 pages, Retrieved from the Internet: URL: http://www.3gpp.org/ftp/Meetings%5F3GPP%5FSYNC/RAN1/Docs/R1%2D1812859%2Ezip, [retrieved on Nov. 11, 2018], p. 6, paragraph 2.3—p. 10, paragraph 2.5, figures 7-10, p. 12, Line 1-Line 2, Section 1. Introduction Section 2: Physical Layer Enhancement for IAB, Section 2.3: Frame structure design and access and backhaull multiplexing Section 2.5: Cross-link interference considerations.

Huawei, et al., "On Cross-Link Interference in IAB", 3GPP Draft, 3GPP TSG RAN WG1 Meeting #94bis, R1-1810134, 3rd Generation Partnership Project (3GPP), Mobile Competence Centre; 650, Route Des Lucioles; F-06921, Sophia-Antipolis Cedex; France, vol. RAN WG1, No. Chengdu, China, Oct. 8, 2018-Oct. 12, 2018, Sep. 29, 2018 (Sep. 29, 2018), XP051517549, 10 pages, Retrieved from the Internet: URL: http://www.3gpp.org/ftp/tsg%5Fran/WG1%5FRL1/TSGR1%5F94b/Docs/R1%2D1810134%2Ezip [retrieved on Sep. 29, 2018] Section 1. Introduction Section 2.1 CLI sccenario analysis.

Huawei: "Overview Consideration on RAN1 IAB aspects," 3GPP Draft; 3GPP TSG-RAN WG2 #103, R2-1812758, Overview Consideration on RAN1 IAB Aspects, 3rd Generation Partnership Project (3GPP), Mobile Competence Centre; 650, Route Des Lucioles; F-06921, Sophia-Antipolis Cedex; France, vol. RAN WG2, No. Gothenburg, Sweden; Aug. 20, 2018-Aug. 24, 2018, Aug. 10, 2018 (Aug. 10, 2018), XP051522352, 3 pages, Retrieved from the Internet: URL: http://www.3gpp.org/ftp/tsg%5Fran/WG2%5FRL2/TSGR2%5F103/Docs/R2%2D1812758%2Ezip [retrieved on Aug. 10, 2018] the whole document.

International Search Report and Written Opinion—PCT/US2021/014760—ISA/EPO—May 7, 2021.

Samsung: "Interference Measurement Table and Beam Coordination", 3GPP Draft, 3GPP TSG RAN WG1 Meeting NR AH#3, R1-1716039-Interference Measurement Table and Beam Coordination, 3rd Generation Partnership Project (3GPP), Mobile Competence Centre; 650, Route Des Lucioles; F-06921, Sophia-Antipolis Cedex; France, vol. RAN WG1, No. Nagoya, Japan; Sep. 18, 2017-Sep. 21, 2017, Sep. 17, 2017 (Sep. 17, 2017), XP051339498, 7 pages, Retrieved from the Internet: URL: http://www.3gpp.org/ftp/Meetings_3GPP_SYNC/RAN1/Docs/ [retrieved on Sep. 17, 2017] Section 2, Discussions Section 2.1 TRP-TRP and DL-UL Interference Measurement Table; the whole document.

* cited by examiner

MEASUREMENT REPORT TECHNIQUES FOR WIRELESS COMMUNICATIONS SYSTEMS

CROSS REFERENCE

The present Application for Patent claims the benefit of U.S. Provisional Patent Application No. 62/964,244 by LUO et al., entitled "MEASUREMENT REPORT TECHNIQUES FOR WIRELESS COMMUNICATIONS SYSTEMS," filed Jan. 22, 2020, assigned to the assignee hereof, and expressly incorporated herein.

FIELD OF TECHNOLOGY

The following relates generally to wireless communications and more specifically to measurement report techniques for wireless communications systems.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Wireless multiple-access technologies have been adopted in various telecommunication standards to provide a common protocol that enables different wireless devices to communicate on a municipal, national, regional, and even global level. An example telecommunication standard is LTE. LTE is designed to improve spectral efficiency, lower costs, improve services, make use of new spectrum, and better integrate with other open standards. LTE may use OFDMA on the downlink, single-carrier frequency division multiple access (SC-FDMA) on the uplink, and multiple-input multiple-output (MIMO) antenna technology.

In some wireless communications systems, one or more wireless devices (e.g., base stations, wireless nodes, UEs) may experience interference. For example, a wireless device may use a reception beam to receive communications intended for the wireless device. However, the quality of the communications may be negatively impacted by interference from other signals in the wireless communications system (e.g., inter-carrier interference, cross-link interference).

SUMMARY

The techniques described herein relate to improved methods, systems, devices, and apparatuses that support measurement reporting for wireless communications systems. The described techniques may enable a wireless node to establish a connection with another wireless node (e.g., a parent node or a child node in an integrated access and backhaul (IAB) system). The wireless node may perform an interference measurement at a receive beam and transmit a report indicating the interference measurement. Such a report may enable one or more wireless nodes to schedule communications based on the interference measurements, which may mitigate the effects of interference while ensuring efficient communications. In some examples, the wireless node may be configured (e.g., by another wireless node) to transmit the report as described herein. Additionally, or alternatively, the wireless node may select a set of beams for reporting interference measurements, for example, based on a selection criteria. The report may indicate the measurements and the corresponding beams, among other examples of information as described herein.

A method of wireless communications at a first wireless node in a wireless communications system is described. The method may include establishing a communications link with a second wireless node in the wireless communications system, where the second wireless node is a parent node or a child node of the first wireless node, receiving, via a first reception beam of the first wireless node, an interfering signal from an aggressor wireless node in the wireless communications system, performing an interference measurement of the interfering signal at the first reception beam, and transmitting, to the second wireless node, a report indicating the interference measurement.

An apparatus for wireless communications at a first wireless node in a wireless communications system is described. The apparatus may include a processor, memory coupled with the processor, and instructions stored in the memory. The instructions may be executable by the processor to cause the apparatus to establish a communications link with a second wireless node in the wireless communications system, where the second wireless node is a parent node or a child node of the first wireless node, receive, via a first reception beam of the first wireless node, an interfering signal from an aggressor wireless node in the wireless communications system, perform an interference measurement of the interfering signal at the first reception beam, and transmit, to the second wireless node, a report indicating the interference measurement.

Another apparatus for wireless communications at a first wireless node in a wireless communications system is described. The apparatus may include means for establishing a communications link with a second wireless node in the wireless communications system, where the second wireless node is a parent node or a child node of the first wireless node, receiving, via a first reception beam of the first wireless node, an interfering signal from an aggressor wireless node in the wireless communications system, performing an interference measurement of the interfering signal at the first reception beam, and transmitting, to the second wireless node, a report indicating the interference measurement.

A non-transitory computer-readable medium storing code for wireless communications at a first wireless node in a wireless communications system is described. The code may include instructions executable by a processor to establish a communications link with a second wireless node in the wireless communications system, where the second wireless node is a parent node or a child node of the first wireless node, receive, via a first reception beam of the first wireless node, an interfering signal from an aggressor wireless node in the wireless communications system, perform an interference measurement of the interfering signal at the first reception beam, and transmit, to the second wireless node, a report indicating the interference measurement.

A method of wireless communications at a first wireless node in a wireless communications system is described. The method may include establishing a communications link with a second wireless node in the wireless communications system, where the second wireless node is in a parent-child relationship with the first wireless node, receiving, from the second wireless node, a report indicating an interference measurement that corresponds to an interfering signal from an aggressor wireless node at a first reception beam of the second wireless node, and scheduling communications with the second wireless node, the aggressor wireless node, or both based on the received report.

An apparatus for wireless communications at a first wireless node in a wireless communications system is described. The apparatus may include a processor, memory coupled with the processor, and instructions stored in the memory. The instructions may be executable by the processor to cause the apparatus to establish a communications link with a second wireless node in the wireless communications system, where the second wireless node is in a parent-child relationship with the first wireless node, receive, from the second wireless node, a report indicating an interference measurement that corresponds to an interfering signal from an aggressor wireless node at a first reception beam of the second wireless node, and schedule communications with the second wireless node, the aggressor wireless node, or both based on the received report.

Another apparatus for wireless communications at a first wireless node in a wireless communications system is described. The apparatus may include means for establishing a communications link with a second wireless node in the wireless communications system, where the second wireless node is in a parent-child relationship with the first wireless node, receiving, from the second wireless node, a report indicating an interference measurement that corresponds to an interfering signal from an aggressor wireless node at a first reception beam of the second wireless node, and scheduling communications with the second wireless node, the aggressor wireless node, or both based on the received report.

A non-transitory computer-readable medium storing code for wireless communications at a first wireless node in a wireless communications system is described. The code may include instructions executable by a processor to establish a communications link with a second wireless node in the wireless communications system, where the second wireless node is in a parent-child relationship with the first wireless node, receive, from the second wireless node, a report indicating an interference measurement that corresponds to an interfering signal from an aggressor wireless node at a first reception beam of the second wireless node, and schedule communications with the second wireless node, the aggressor wireless node, or both based on the received report.

DETAILED DESCRIPTION

Figure 1:
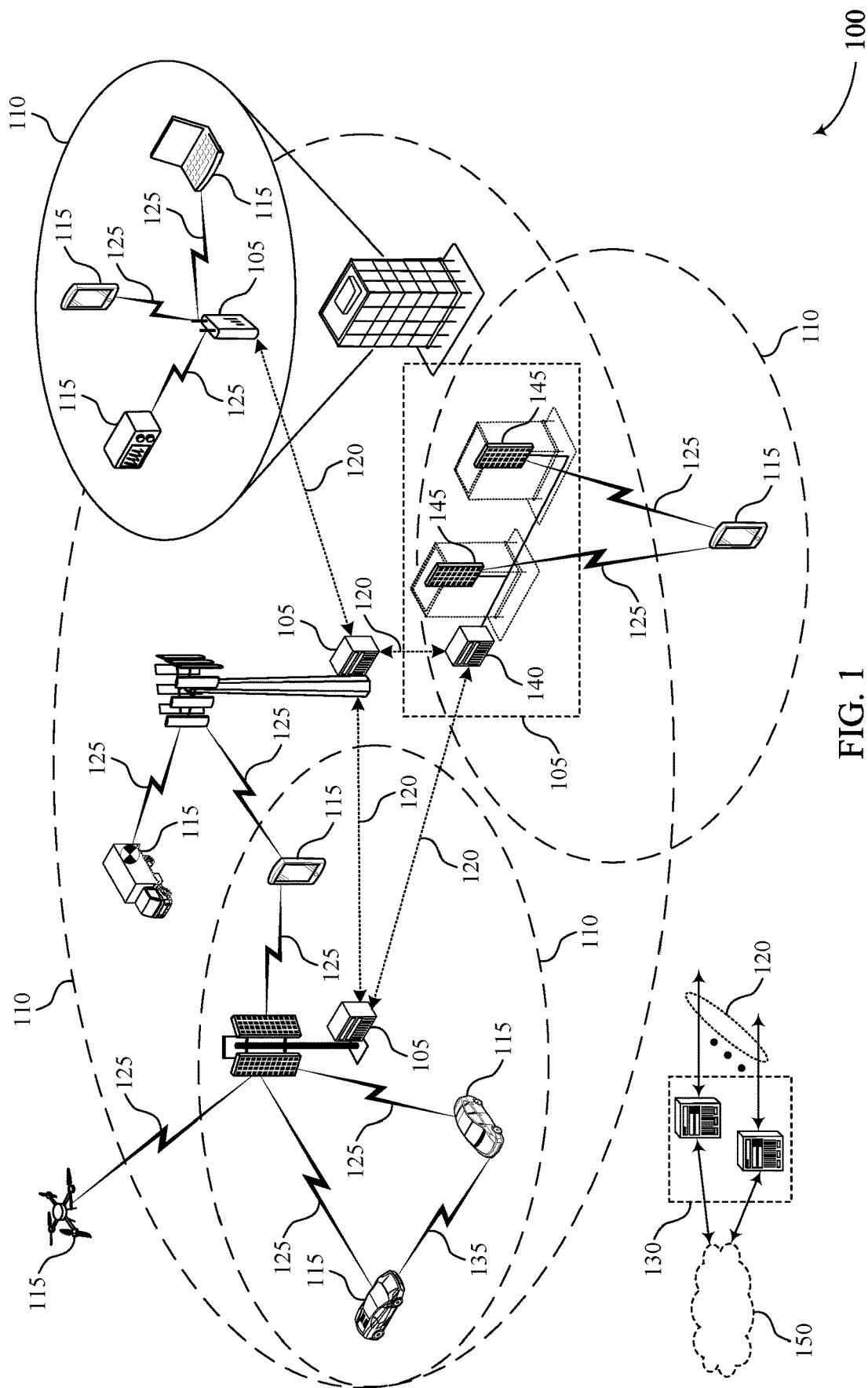
FIG. 1 through 3 illustrate examples of wireless communications systems that support measurement report techniques for wireless communications systems in accordance with aspects of the present disclosure.

Some wireless communications systems may include wireless access nodes (ANs) (e.g., base stations) to facilitate wireless communications between a user equipment (UE) and a network. In some cases, an anchor AN may have a high-capacity, wired, backhaul connection (e.g., fiber) to the network, while communicating with one or more ANs (e.g., relay devices) or UEs, which may be referred to as child nodes. In some examples, an anchor AN may be referred to as a donor node or a parent node. A network that supports communications between a base station and a UE may be referred to as an access network, while a network that supports communications between multiple base stations may be referred to as a backhaul network. Some wireless communications systems may support both an access network and a backhaul network (e.g., an integrated access and backhaul (IAB) network). In deployments supporting both access and backhaul over wireless communication links (e.g., in an IAB network), an IAB node such as a parent node or a child node may experience communication failures. That is, conditions may exist that may cause interference, blockage, etc., on a communication beam (e.g., an active beam of an antenna element). For example, a first wireless node (e.g., a wireless AN in an IAB network, a UE, a base station, among other examples) may use a reception beam to receive communications from a second wireless node. However, the first wireless node may also experience interference from other signals in the system (e.g., other transmission on beams of the second wireless node, transmissions from beams of a third wireless node, or both). In such examples, the first wireless node may be referred to as a victim wireless node and wireless nodes corresponding to the interfering signals may be referred to as aggressor wireless nodes. Such interference may result in a link failure, miscommunications, a reduced data rate, etc.

Accordingly, the techniques described herein may enable a wireless node (e.g., a victim wireless node) to perform an interference measurement of wireless communications and transmit a report indicating the interference measurement. Such a report may enable one or more wireless nodes to schedule communications based on the interference measurements, which may mitigate or reduce the effect of interference on communications in an IAB system while increasing the efficiency of communications. As an example, the techniques described herein may leverage a parent-child relationship between wireless nodes of the IAB system in order to transmit the report without increasing signaling overhead, among other benefits.

In some examples, a wireless node may be configured to transmit a report indicating one or more interference measurements. For example, the wireless node may be configured to transmit the report periodically (e.g., the wireless node may receive control signaling indicating resources or a periodicity for transmitting the report). Additionally, or alternatively, the wireless node may transmit the report aperiodically (e.g., dynamically). For example, the wireless node may receive a request for the report from another node (e.g., a scheduling node such as a parent node or an aggressor node), the wireless node may transmit the report in accordance with one or more triggering conditions (e.g., an interference measurement of one or more beams may satisfy a threshold), or both. In some examples, the wireless node may transmit the report using layer 1 (L1) signaling, layer 2 (L2) signaling, layer 3 (L3) signaling, among other examples of signaling. In some examples, the report may include or indicate one or more parameters corresponding to the interference measurements (e.g., one or more parameters of an interfering signal of an aggressor wireless node measured at a reception beam of a victim wireless node). For example, the one or more parameters may include a transmission power, a reference signal received power (RSRP), a received signal strength indicator (RSSI), a cell identifier (ID), an indication of one or more beams, or any combination thereof.

In some examples, the wireless node may indicate a set of interference measurements in the report based on a selected set of beams. The wireless node may select the beams in accordance with a selection criteria (e.g., configured at the wireless node). For example, the wireless node may select all of the beam pairs at the wireless node. Additionally, or alternatively, the wireless node may select a subset of the beam pairs at the wireless node (e.g., reception beams used for backhaul links or reception beams that may be candidates for scheduling by another wireless node). In some examples, the wireless node may order the beam pairs based on the interference measurements and select a quantity of beam pairs with corresponding interference measurements that satisfy a threshold. Thus, the wireless node may be enabled to transmit a report indicating interference measurements of the selected beams.

Aspects of the disclosure are initially described in the context of wireless communications systems and process flows. Aspects of the disclosure are further illustrated by and described with reference to apparatus diagrams, system diagrams, and flowcharts that relate to measurement report techniques for wireless communications systems.

FIG. 1 illustrates an example of a wireless communications system 100 that supports measurement report techniques for wireless communications systems in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

As described herein, the devices of the wireless communications system 100 may use techniques for interference measurement reporting. For example, a wireless node (e.g., in an IAB system) may be enabled to perform an interference measurement of communications in the wireless communications system 100 and transmit a report indicating the interference measurement. Such a report may enable one or more wireless nodes in the wireless communications system 100 to schedule communications based on the interference measurements, which may mitigate the effects of interference while ensuring efficient communications. As an example, a wireless node may have a parent-child relationship with another wireless node (e.g., a parent wireless node in the wireless communications system 100 may establish a communication link 125 with a child wireless node), which may enable transmission of one or more reports without incurring additional signaling overhead, among other benefits.

Figure 2:
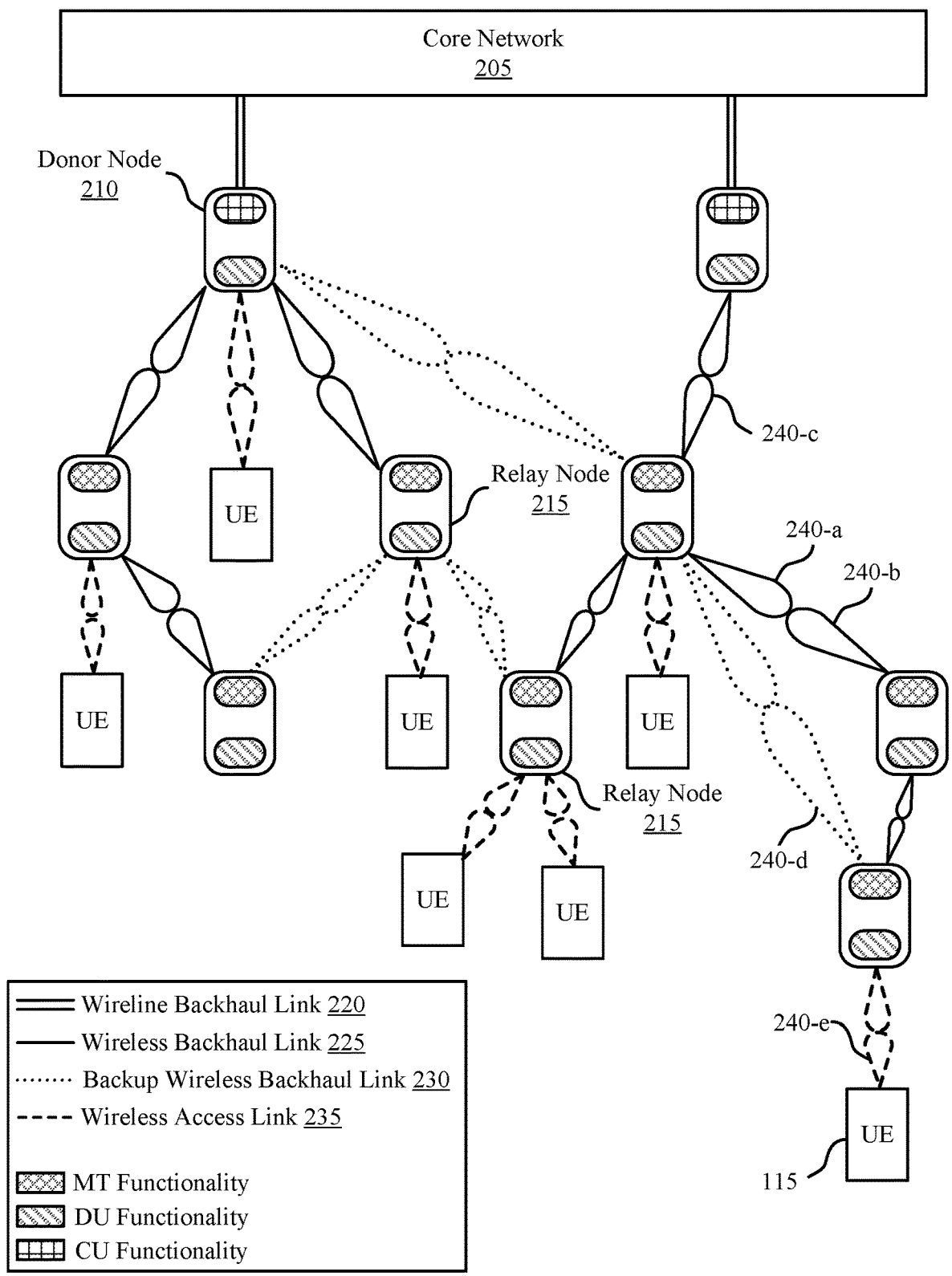

In some examples, a wireless node may be configured to transmit a report indicating one or more interference measurements (e.g., corresponding to a set of beams selected by the wireless node) via a communication link 125. For example, the wireless node may be configured to transmit the report periodically (e.g., the wireless node may receive control signaling indicating resources or a periodicity for transmitting the report). Additionally, or alternatively, the wireless node may transmit the report aperiodically (e.g., dynamically). For example, the wireless node may receive a request for the report from another node (e.g., a scheduling node such as a parent node or an aggressor node), the wireless node may transmit the report in accordance with one or more triggering conditions (e.g., an interference measurement of one or more beams may satisfy a threshold), or both. In some examples, the wireless node may transmit the report using L1 signaling, L2 signaling, L3 signaling, among other examples of signaling. In some examples, the report may include or indicate one or more parameters corresponding to the interference measurements (e.g., one or more parameters of an interfering signal of an aggressor wireless node measured at a reception beam of a victim wireless node). For example, the one or more parameters may include a transmission power, an RSRP, an RSSI, a cell ID, an indication of one or more beams (e.g., a selected set of beams), or any combination thereof FIG. 2 illustrates an example of a wireless communications system 200 that supports acknowledgment messaging for resource reservations in accordance with one or more aspects of the present disclosure. Wireless communications system 200 (e.g., an NR system) may supplement wireline backhaul connections (e.g., wireline backhaul links 220) by sharing infrastructure and spectral resources for network access with wireless backhaul link capabilities, providing an IAB network architecture. Wireless communications system 200 may include a core network 205 and base stations 105 or supported devices split into one or more support entities (i.e., functionalities) for promoting wireless backhaul density in collaboration with communication access. Aspects of the supporting functionalities of the base stations 105 may be referred to as wireless IAB nodes, such as Donor nodes 210 and Relay nodes 215. Wireless communications system 200 may additionally support a number of UEs 115, which may communicate on the uplink with one or more Donor nodes 210, Relay nodes 215, or a combination of these devices. In some examples, wireless communications system 200 may implement aspects of wireless communications system 100.

Wireless communications system 200 may include one or more Donor nodes 210, which may interface between a wireline network and a wireless network. In some cases, an Donor node 210 may be referred to as an anchor node, as the Donor node 210 anchors the wireless network to a wireline connection. For example, each Donor node 210 may include at least one wireline backhaul link 220 and one or more additional links (e.g., primary wireless backhaul links 225, backup wireless backhaul links 230, wireless access links 235, etc.). As illustrated herein, the various wireless links in the wireless communications system 200 may also include one or more beams 240 (e.g., beam pairs including a reception beam and a transmission beam between the various wireless nodes). An Donor node 210 may be split into associated base station central unit (CU) and distributed unit (DU) entities, where one or more DUs associated with an Donor node 210 may be partially controlled by an associated CU. CUs of Donor nodes 210 may host layer 3 (L3) (e.g., radio resource control (RRC), service data adaption protocol (SDAP), packet data convergence protocol (PDCP), etc.) functionality and signaling. Furthermore, CUs of Donor nodes 210 may communicate with the core network 205 over a wireline backhaul link 220 (e.g., which may be referred to as an NG interface). DUs may host lower layer operations, such as layer 1 (L1) or layer 2 (L2) (e.g., radio link control (RLC), medium access control (MAC), physical (PHY) layer, etc.) functionality and signaling. A DU entity of an Donor node 210 may support a serving cell within the network coverage area according to connections associated with primary wireless backhaul links 225, or backup wireless backhaul links 230, and wireless access links 235 of the IAB network. DUs of the Donor nodes 210 may control both access and backhaul links within the corresponding network coverage and may provide controlling and scheduling for descendant (i.e., child) Relay nodes 215 and or UEs 115. For example, a DU may support an RLC channel connection with a UE 115 (e.g., via a wireless access link 235) or with an Relay node 215 (e.g., via a backhaul link, such as a primary wireless backhaul link 225 or a backup wireless backhaul link 230).

Relay nodes 215 may be split into associated mobile terminal (MT) and base station DU entities, where MT functionality of the Relay nodes 215 may be controlled or scheduled by antecedent (i.e., parent) IAB nodes via wireless backhaul links. A parent node to a relay node 215 (i.e., a child node) may be another (antecedent) relay node 215 or an Donor node 210. The MT functionality may be similar to functionality performed by UEs 115 in the system. An Relay node 215 may not be directly connected to a wireline backhaul 220. Instead, the Relay node 215 may connect to the core network 205 via other IAB nodes (e.g., any number of additional Relay nodes 215 and an Donor node 210) using wireless backhaul links. The Relay node 215 may transmit upstream (e.g., towards the core network 205) in the IAB system using MT functionality. In some cases, DUs of the Relay nodes 215 may be partially controlled by signaling messages from CU entities of an associated Donor node 210 (e.g., transmitted via an F1-application protocol (AP)). The DUs of the Relay nodes 215 may support serving cells of the network coverage area. For example, a DU of an Relay node 215 may perform the same or similar functions as a DU of an Donor node 210, supporting one or more wireless access links 235 for UEs 115, one or more wireless backhaul links for downstream Relay nodes 215, or both.

Wireless communications system 200 may employ relay chains for communications within the IAB network architecture. For example, a UE 115 may communicate with an IAB node, and the IAB node may relay the data to a base station CU (e.g., a network entity or network device) or the core network 205 either directly or via one or more Relay nodes 215. Each Relay node 215 may include a primary wireless backhaul link 225 for relaying data upstream or receiving information from a base station CU or the core network 205. In some cases, an Relay node 215 may additionally include one or more backup wireless backhaul links 230 (e.g., for redundant connectivity or improved robustness). If the primary wireless backhaul link 225 fails (e.g., due to interference, malfunction at a connected IAB node, movement of IAB nodes, maintenance at IAB nodes, etc.), an Relay node 215 may utilize a backup wireless backhaul link 230 for backhaul communication within the IAB network. The first or primary wireless backhaul link 225 may be associated with a coverage area and MT functionality may be controlled or scheduled by a first parent node. The one or more secondary backhaul links (e.g., backup wireless backhaul links 230) may be associated with a non-collocated coverage area and controlled or scheduled by one or more parent nodes. Each of the primary backhaul connections and the one or more secondary connections may support spectral capabilities to provide network communication over one or more RATs. The one or more IAB nodes may further support base station DU entities and may support multiple backhaul and wireless access links within the relay chain. The DU entities may control or schedule descendant Relay nodes 215 and UEs 115 within the IAB network (e.g., downstream in the IAB network) via the configured backhaul and wireless access links. That is, an Relay node 215 may act as a relay between an Donor node 210 and one or more descendant devices (e.g., other Relay nodes 215, UEs 115, etc.) in both communication directions based on established backhaul and access connections.

The operations performed by the wireless devices in the wireless communications system 200 may be static or dynamic. For example, in a dynamic IAB system, a wireless device may function as a donor node 210, a relay node 215, a parent node, a child node, or any combination of these. In some cases, wireless devices may dynamically switch between the different roles in the IAB system (e.g., based on configurations, channel conditions, neighboring devices, etc.). In other cases, wireless devices may function in multiple different roles at the same time (e.g., a single wireless device, such as a base station 105 or UE 115, may act as a parent node for one wireless device and a child node for another wireless device).

In some examples, there may be interference between one or more communications of the wireless communications system 200. As an illustrative example, a wireless node (e.g., a relay node 215, a donor node 210, or a UE 115) may receive or transmit communications using one or more beams 240 corresponding to a communications link (e.g., a primary wireless backhaul link 225, a backup wireless backhaul link 230, a wireless access link 235, etc.). For instance, a wireless node may receive signals carried by a transmission beam 240-a using a reception beam 240-b. In such examples, the transmission beam 240-a may be referred to as a serving beam (e.g., carrying signals intended for the wireless node). However, the other communications in the wireless communications system 200 may interfere with the reception of the signals of the transmission beam 240-a. For example, transmission beams 240-c, 240-d, 240-e, or any combination thereof may be picked up by the reception beam 240-b, which may result in relatively inefficient communications.

As described herein, the devices of wireless communications system 200 (e.g., Relay nodes 215, Donor nodes 210, a CU, a DU, or a combination thereof) may use techniques for interference measurement reporting. For example, a wireless node (e.g., a relay node 215, a donor node 210, or a UE 115) may be enabled to perform an interference measurement of communications in the wireless communications system 200 (e.g., interfering signals of transmission beams 240-c, 240-d, 240-e, etc. at a reception beam 240-b) and transmit a report indicating the interference measurement. Such a report may enable one or more wireless nodes in the wireless communications system 200 to schedule communications based on the interference measurements, which may mitigate the effects of interference while ensuring efficient communications.

In some examples, a wireless node may be configured to transmit a report indicating one or more interference measurements (e.g., corresponding to a set of beams 240 selected by the wireless node). For example, the wireless node may be configured to transmit the report periodically (e.g., the wireless node may receive control signaling indicating resources or a periodicity for transmitting the report). Additionally, or alternatively, the wireless node may transmit the report aperiodically (e.g., dynamically). For example, the wireless node may receive a request for the report from another node (e.g., a scheduling node such as a parent node or an aggressor node), the wireless node may transmit the report in accordance with one or more triggering conditions (e.g., an interference measurement of one or more beams may satisfy a threshold), or both. In some examples, the wireless node may transmit the report using L1 signaling, L2 signaling, L3 signaling, among other examples of signaling. In some examples, the report may include or indicate one or more parameters corresponding to the interference measurements (e.g., one or more parameters of an interfering signal of an aggressor wireless node measured at a reception beam of a victim wireless node). For example, the one or more parameters may include a transmission power, an RSRP, an RSSI, a cell ID, an indication of one or more beams (e.g., a selected set of beams), or any combination thereof.

Figure 3:
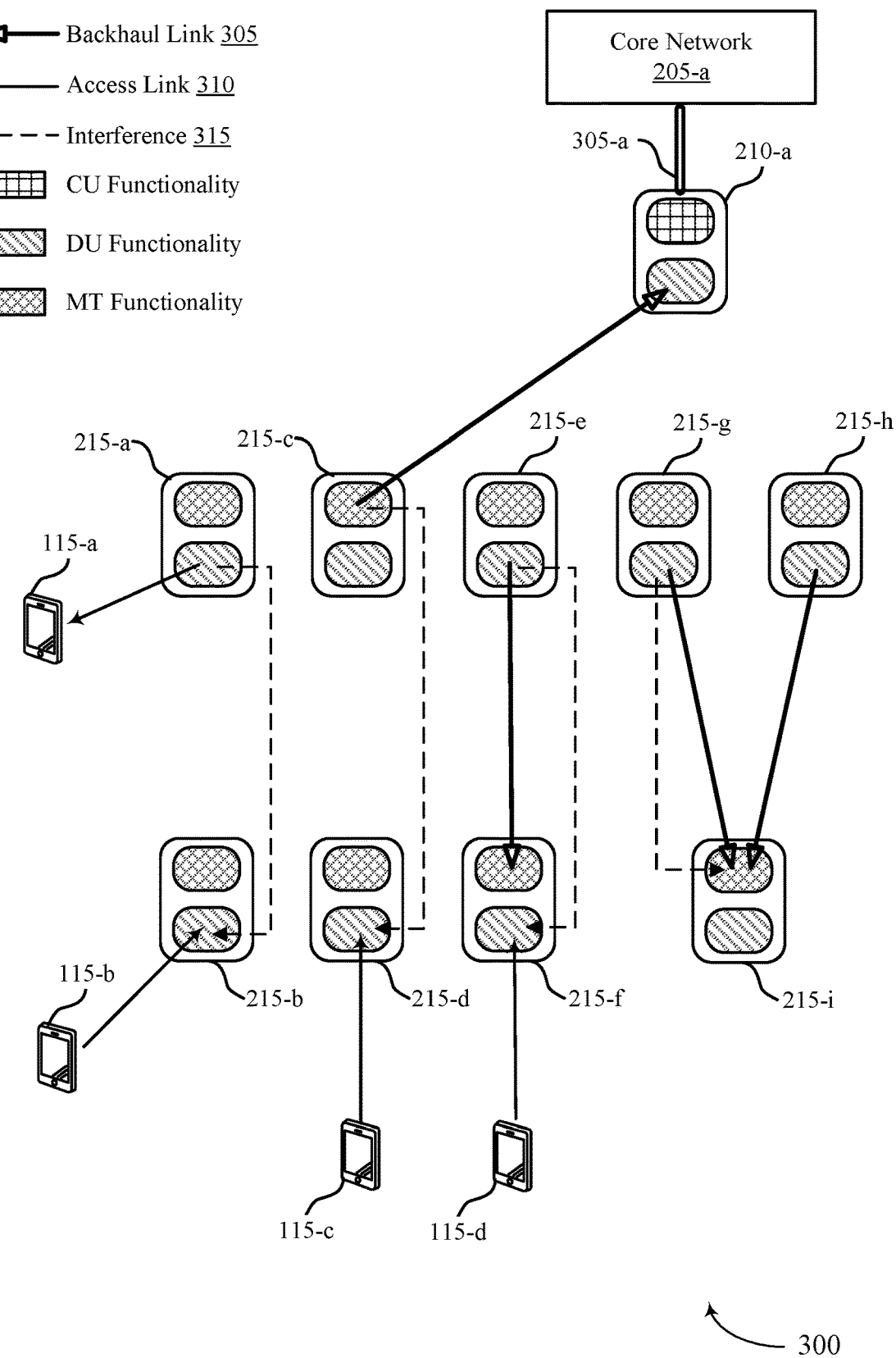

FIG. 3 illustrates an example of a wireless communications system 300 that supports measurement report techniques in accordance with one or more aspects of the present disclosure. Wireless communications system 300 may implement aspects of the wireless communications system 100 or the wireless communications system 200. For example, the wireless communications system 300 may include one or more wireless devices (e.g., wireless IAB nodes), such as a core network 205-a, donor nodes 210, relay nodes 215, UEs 115, among other examples of devices and aspects of the wireless communications systems 100 and 200. Generally, the wireless communications system 300 shows illustrative examples of various interference scenarios for communications between the wireless devices.

The wireless communications system 300 may support communications between various wireless nodes, such as a core network 205-a, one or more donor nodes 210, relay nodes 215, or UEs 115. For example, the various wireless nodes may transmit signals (e.g., via transmission beams at a wireless node) or receive signals (e.g., via reception beams at a wireless node) using one or more backhaul links 305 or access links 310, which may be examples of primary wireless backhaul links 225, or backup wireless backhaul links 230, and wireless access links 235 as described here with reference to FIG. 2, respectively. In some examples, one or more wireless nodes may be subject to interference 315, for example, at one or more reception beams of the wireless nodes. Although illustrated as interference 315 being received at the antennas of child nodes (e.g., the relay nodes 215-b, 215-d, 215-f, and 215-i) for illustrative clarity, it is to be understood that the interference 315 may be received at one or more parent nodes (e.g., the relay nodes 215-a, 215-c, 215-e, 215-g, and 215-h) or one a grandparent node (e.g., the donor node 210-a). In some examples, the wireless nodes may implement aspects of time division duplex (TDD) techniques (e.g., dynamic TDD or static TDD), spatial divisional multiplexing (SDM) techniques (e.g., SDM techniques with adjacent hops across IAB nodes or co-channel diversity combining (DC) with SDM techniques, etc.), which may result in cross-link interference (CLI) or inter-carrier interference (ICI) in the wireless communications system 300, among other examples of interference.

As one illustrative example, a relay node 215-a (e.g., a parent node or a child node) may establish communications with a UE 115-a (e.g., via an access link 310) and a relay node 215-b may establish communications with a UE 115-b. For example, the relay node 215-b may use a reception beam of the relay node 215-b to receive a signal from the UE 115-b (e.g., via a transmission beam of the UE 115-b). The reception beam of the relay node 215-b may also receive interference 315 from signals of the relay node 215-a (or from the UE 115-a). For example, the relay node 215-a may transmit a signal via a transmission beam of the relay node 215-a and the signal may result in interference 315 at the reception beam of the relay node 215-b. In such examples, the relay node 215-a may be referred to as an aggressor wireless node and the relay node 215-b may be referred to as a victim wireless node.

In some examples, the relay node 215-d may be an example of a victim wireless node. For example, a reception beam of the relay node 215-d (e.g., receiving signals over a communication link with the UE 115-c) may receive interference 315 from communications between the relay node 215-c and the donor node 210-a. In some examples, the relay node 215-f may be an example of a victim wireless node. A reception beam of the relay node 215-f (e.g., receiving signals over an access link 310 from the UE 115-d) may receive interference 315 from communications between the relay node 215-e and the relay node 215-f. That is, the relay node 215-e may transmit a signal to the relay node 215-f (e.g., using a transmission beam of the relay node 215-e) and the reception beam may receive interference 315 from the signal from the relay node 215-e, for example, when the reception beam is paired to a transmission beam of the UE 115-d, which may degrade the quality of communications between the relay node 215-f and the UE 115-d. In some examples, the relay node 215-i may be an example of a victim wireless node. For example, the relay node 215-i may receive a signal from the relay node 215-g using a first reception beam and a signal from the relay node 215-h using a second reception beam. However, the signal intended for the second reception beam may cause interference with the signal intended for the first reception beam, or vice versa. In some examples, some or all of the victim nodes described in FIG. 3 may additionally, or alternatively receive interference 315 from an aggressor wireless node that does not have a parent-child relationship with the victim node or is not included in the IAB network described herein.

Although illustrated with the various access link communications and interference 315 being transmitted in one direction for illustrative clarity, in some examples some or all of the illustrated directions may be reversed or may be directed at different devices than shown. As one illustrative example, the relay node 215-b may use a transmission beam to transmit a signal to the UE 115-b, and a reception beam of the relay node 215-a may receive interference 315 based on the transmitted signal to the UE 115-b. In such examples, the relay node 215-a may be referred to as a victim wireless node and the relay node 215-a may be referred to as a victim wireless node.

The techniques described herein may enable the various devices of the wireless communications system 300 to reduce the impact or likelihood of the interference 315. For example, the wireless communications system 300 may implement techniques for interference measurement reporting. Accordingly, a wireless node (e.g., a victim wireless node) may be enabled to perform an interference measurement of communications in the wireless communications system 300 and transmit a report indicating the interference measurement. Such a report may enable one or more wireless nodes (e.g., scheduling wireless nodes such as parent wireless nodes or aggressor wireless nodes) to schedule communications based on the interference measurements, which may mitigate the effects of the interference 315 while ensuring efficient communications.

As one illustrative example, the relay node 215-i (e.g., as a victim node) may transmit a report to one or both of the relay nodes 215-g and 215-h (e.g., each of which may be an aggressor node), the report indicating a measurement for a first beam pair (e.g., a reception beam of the relay node 215-i and a transmission beam of the relay node 215-h) or a second beam pair (e.g., a different reception beam of the relay node 215-i and a transmission beam of the relay node 215-g). The relay node 215-g and the relay node 215-h may co-ordinate communications based on the received report.

As another illustrative example, the relay node 215-c (e.g., a parent node) may be an example of an aggressor node and may send transmissions to the donor node 210-a (e.g., a grandparent node), the relay node 215-d (e.g., a child node), and a relay node 215-b (e.g., a child node). In some examples, the relay node 215-d may transmit a report to the relay node 215-c (e.g., indicating measurements of a receive beam of the relay node 215-c and interfering transmission beams of the relay node 215-c). The relay node 215-b may also transmit a report to the relay node 215-c (e.g., indicating measurements of a receive beam of the relay node 215-b and interfering transmission beams of the relay node 215-c) and the donor node 210-a may also transmit a report to the relay node 215-c (e.g., indicating measurements of a receive beam of the donor node 210-a and interfering transmission beams of the relay node 215-c). The relay node 215-c may schedule communications based on the report (e.g., selecting one or more of the transmission beams for communications such as SDM communications, refraining from utilizing one or more of the reported transmission beams).

Figure 4:
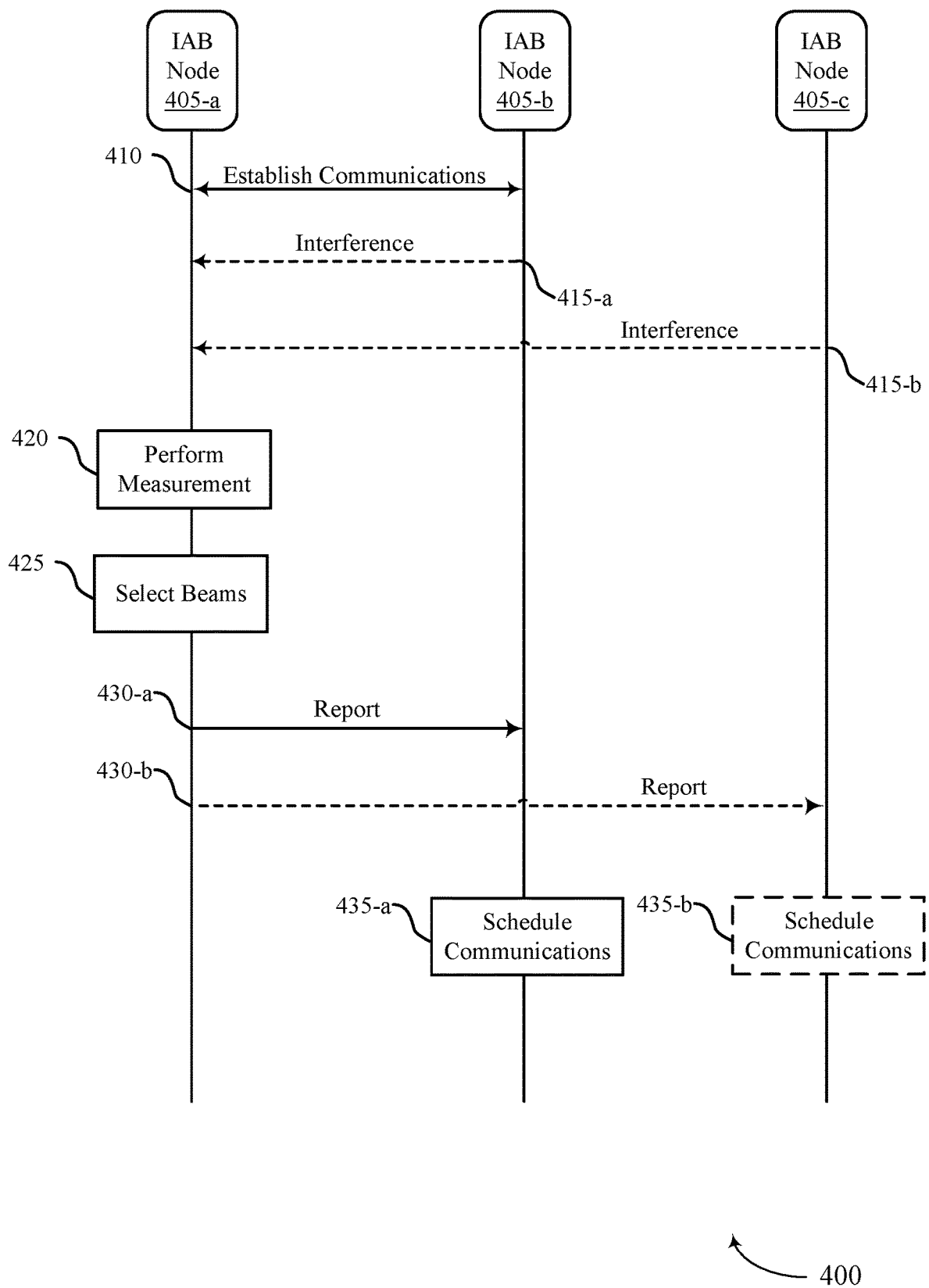
FIG. 4 illustrates an example of a process flow that supports measurement report techniques for wireless communications systems in accordance with aspects of the present disclosure.

FIG. 4 illustrates an example of a process flow 400 that supports measurement report techniques for wireless communications systems in accordance with one or more aspects of the present disclosure. The process flow 400 may illustrate an example of interference measurement reporting in a wireless communications system (e.g., an IAB system). For example, the IAB nodes 405 may be examples of one or more wireless nodes as described herein (e.g., a base station 105, a CU, a DU, a relay node 215, a donor node 210, a UE 115, a parent node, a child node, a victim node, an aggressor node, etc.). In some cases, some operations illustrated as being performed by the IAB node 405-a, the IAB node 405-b or the IAB node 405-c may be performed by any other IAB node 405 or other wireless device as described herein. Additionally, alternative examples of the following may be implemented, where some operations may be performed in a different order than described or are not performed at all. In some cases, operations may include additional features not mentioned below, or further processes or communications may be added.

At 410, the IAB node 405-a and the IAB node 405-b may establish communications. In some examples, the IAB node 405-a and the IAB node 405-b may have a parent-child relationship (e.g., the IAB node 405-a may be a child node of the IAB node 405-b or the IAB node 405-a may be a parent node of the IAB node 405-b). The communications may be established as part of the parent-child relationship. For example, the IAB node 405-a and the IAB node 405-b may establish a primary wireless backhaul link 225 for communications as described herein with reference to FIG. 2. The IAB node 405-a and the IAB node 405-b may communicate using signals and one or more reception beams or transmission beams. For example, the IAB node 405-b may transmit a signal intended for the IAB node 405-a using a serving transmission beam. The IAB node 405-a may receive the signal using a reception beam corresponding to the serving transmission beam (e.g., a beam pair including the reception beam and the serving transmission beam).

In some examples, at 415-a the IAB node 405-a may receive interference from the IAB node 405-b (e.g., interference 315 as described with reference to FIG. 3). As an illustrative example, the IAB node 405-b may transmit an interfering signal (e.g., an interfering signal intended for another wireless device such as the IAB node 405-c, among other examples of interference scenarios as described with reference to FIG. 3). In such examples, the IAB node 405-b may be an example of an aggressor wireless node. In some examples, the IAB node 405-b may be a parent node or a child node of the IAB node 405-a. In some cases, the interfering signal may be transmitted via a first transmission beam different than the serving transmission beam. In some examples, the interference at 415-a may degrade the quality of communications at the reception beam of the IAB node 405-a, which may result in a relatively poor data rate, communication errors, etc.

Additionally, or alternatively, at 415-b the IAB node 405-a may receive interference from the IAB node 405-c. In some examples, the IAB node 405-c may not have a parent-child relationship with the IAB node 405-a (e.g., the IAB node 405-c may be another child node or another parent node of the IAB node 405-b, a grandparent node of the IAB node 405-a, a wireless node outside of an IAB system, among other examples). The IAB node 405-c may send one or more interfering signals via a second transmission beam of the IAB node 405-c, which may result in interference at the reception beam of the IAB node 405-a. In some examples, the interference at 415-a may degrade the quality of communications at the reception beam of the IAB node 405-a, which may result in a relatively poor data rate, communication errors, etc.

At 420, the IAB node 405-a may perform one or more measurements. For example, the IAB node 405-a may perform an interference measurement corresponding to the interference at 415-a or the interference at 415-b. The interference measurement may include a measurement corresponding to an interfering signal of a transmission beam (e.g., of the IAB node 405-b or the IAB node 405-c) at a reception beam of the IAB node 405-a. For example, the IAB node 405-a may measure an RSRP or an RSSI for an interfering signal at a reception beam, or the IAB node 405-a may receive or measure a transmission power of the signals from the one or more aggressor nodes (e.g., the IAB node 405-b or the IAB node 405-c), which may enable the IAB node 405-a to derive an interference measurement (e.g., an RSRP or an RSSI).

In some examples, the IAB node 405-a may perform such interference measurements over a set of interfering beam pairs (e.g., beam pairs excluding one or more serving reception beams or serving transmission beams between the IAB node 405-a and the IAB node 405-b). For example, the IAB node 405-a may perform interference measurements for a set of interfering beams excluding serving beams represented by a matrix denoted by [NTX, NRX]_inf, where NTX may represent the number of transmission beam candidates at an aggressor node (e.g., the IAB node 405-b or the IAB node 405-c) over its MT and DU for supported cells of the aggressor node, and where NRX may represent the number of reception beam candidates at a victim node (e.g., the IAB node 405-a) over its MT and DU for supported cells of the victim node. In some examples, the parent node may be an aggressor node and a child node may be the victim node. In such examples, the victim child node may determine the interference measurements over all or a subset of a matrix of the interfering beam pairs denoted by [NTX_P, NRX_C]_inf, which may represent the set of beams between the child node (e.g., NTX_C) and the parent node (e.g., NTX_P) that excludes serving beams between the nodes. In some examples, the child node may be an aggressor node and the parent node may be the victim node. In such examples, the victim parent node may determine the interference measurements over all of a subset of the interfering beam pairs denoted by [NTX_C, NRX_P]_inf, which may represent the set of beams between the child node (e.g., NTX_C) and the parent node (e.g., NTX_P) that excludes serving beams between the nodes. In some examples, there may be a transmission beam and reception beam correspondence at a parent node and a child node (e.g., when the IAB node 405-a and the IAB node 405-b have a parent-child relationship), and the interference measurements may be determined based on an indicated or prior knowledge of transmission power at the other node. In some examples, the IAB node 405-a may generate a matrix of the interference measurements corresponding to [NTX, NRX]_inf (e.g., a matrix of results of the interference measurements for each beam pair of the matrix, such as an RSSI or RSRP value).

At 425, the IAB node 405-a may select beams to include or indicate in a report. For example, the IAB node 405-a may indicate a set of interference measurements corresponding a selected set of beams (e.g., interfering beam pairs) to another IAB node 405. As an illustrative example, the IAB node 405-a may perform interference measurements for a first beam pair (e.g., a serving reception beam of the IAB node 405-a and a first interfering transmission beam from the IAB node 405-b) and a second beam pair (e.g., the serving reception beam of the IAB node 405-a and a second interfering transmission beam from the IAB node 405-c) and may indicate the interference measurements to the IAB node 405-b or the IAB node 405-c at 430-a and 430-b, respectively. In some examples, the IAB node 405-a may indicate more or less interference measurements based on selecting the set of beams. For example, the IAB node 405-a may select the first beam pair (e.g., based on a selection criteria) and refrain from selection the second beam pair. In such an example, the IAB node 405-a may report (e.g., indicate) the interference measurement of the first beam pair and refrain from reporting the interference measurement of the second beam pair.

In some examples, the IAB node 405-a may be configured (e.g., via RRC signaling, F1 application protocol (AP) signaling, or a pre-configuration of the IAB node 405-a) to select the set of beams based on a selection criteria. For example, the IAB node 405-a (e.g., the victim node) may select all of the beam pairs at the IAB node 405-a based on a selection criteria. In such an example, the IAB node 405-a may include indications of the interference reports for each beam pair in a report (e.g., all of the measurement reports generated at 420). In some examples, the IAB node 405-a may select a subset of the beam pairs at the IAB node 405-a based on the selection criteria. For example, the IAB node 405-a may be configured to select a subset of reception beams of the IAB node 405-a (e.g., the victim node), such as a subset of reception beams used for backhaul links, a subset of reception beams that may be scheduled by the aggressor node, a subset of reception beams that may be scheduled by a parent of the victim node, among other examples. Additionally, or alternatively, the IAB node 405-*a* may select a subset of beam pairs based on a threshold. In some cases, the IAB node 405-*a* may compare a result of an interference measurement for each beam pair to the threshold and include the beam pair in the report based on the comparison. For example, the IAB node 405-*a* may determine to indicate a subset of beam pairs with an RSRP or an RSSI that satisfy the threshold (e.g., exceed a threshold or are below a threshold). In some examples, the IAB node 405-*a* may indicate a top quantity of beam pairs with a highest or lowest interference measurement report (e.g., a top K beam pairs with a relatively high interference or a top K beam pairs with a relatively low interference).

At 430-*a*, the IAB node 405-*a* may transmit a report to the IAB node 405-*b*. The report may indicate one or more interference measurements as described herein. Additionally, or alternatively, in some examples the IAB node 405-*a* may transmit the report to the IAB node 405-*c* at 430-*b*. For example, the IAB node 405-*c* may be an example of an aggressor wireless node causing interference at a reception beam of the IAB node 405-*a* or the IAB node 405-*c* may have a parent-child relationship to the IAB node 405-*b*, and the IAB node 405-*c* may use a report at 430-*b* in order to schedule communications to reduce interference at the reception beam of the IAB node 405-*a*. Such reporting to the IAB node 405-*b* or the IAB node 405-*c* may enable enhanced communications and reduced interference.

In some examples, the IAB node 405-*a* may be configured to transmit the report. For example, the IAB node 405-*a* may be configured to transmit the report periodically via RRC signaling or F1 AP signaling, among other examples of signaling (e.g., a CU may configure the IAB node 405-*a* using one or more hops as described with reference to FIG. 2, such as a parent node forwarding the signaling to the IAB node 405-*a*). In such examples, the IAB node 405-*a* may receive a configuration with configuration information for transmitting the report (e.g., resources, a periodicity, etc.).

In some examples, the IAB node 405-*a* may transmit the report aperiodically. For example, the IAB node 405-*a* may receive a request for the report (e.g., from the IAB node 405-*b* or the IAB node 405-*c*) and may transmit the report in accordance with the request. In some examples, the wireless node transmitting the request (e.g., an aggressor wireless node) may be a parent node and may transmit the request (e.g., an indication for the request) via a downlink MAC CE, a physical downlink control channel (PDCCH), DCI, or a combination thereof. In some examples, the wireless node transmitting the request may be a child node and may transmit the request via an uplink MAC CE, a physical uplink control channel (PUCCH), UCI, or a combination thereof.

In some examples, the IAB node 405-*a* may transmit the report based on an event trigger (e.g., an event triggered aperiodic report). For example, the IAB node 405-*a* may detect that a result of the interference measurements at 420 satisfies a threshold (e.g., a beam pair has a relatively low interference measurement below a lower threshold, a relatively high interference measurement above an upper threshold, or both). In such examples, the IAB node 405-*a* may determine that a triggering condition is met and generate or transmit the report accordingly. For instance, the IAB node 405-*a* may generate a L1 (e.g., PUCCH, a physical uplink shared channel (PUSCH), PDCCH, a physical downlink shared channel (PDSCH), etc.) report or a L2 (e.g., MAC CE) report based on the satisfied threshold. In some examples, the IAB node 405-*a* may be a parent node and may schedule a downlink grant to the IAB node 410-*b* for transmission of the report. In some examples, the IAB node 405-*a* may be a child node and may send an SR to request an uplink grant for transmission of the report.

In some examples, the report may include or otherwise indicate one or more parameters associated with the interference measurements. For example, the one or more parameters may include one or more measurement values (e.g., RSSI or RSRP values for all or a selected set of beam pairs). The one or more parameters may also include an indication of one or more beams, such as all or a selected set of beam pairs, a set of transmission beams of the beam pairs, a set of reception beams of the beam pairs, or any combination thereof. For example, a beam may be indicated in the report via an explicit beam index or a resource index for an interference measurement that may be used to derive the beam index (e.g., by the IAB node 405-*b*). In some examples, the one or more parameters may indicate the selected interfering transmission beams (e.g., when the interference measurement is configured for a specific reception beam over a set of interfering transmission beams). In some examples, the one or more parameters may the selected reception beams (e.g., when the interference measurement is configured for a specific interfering transmission beam over a set of reception beams). In some examples, the one or more parameters may indicate both the selected transmission beam and reception beam of a beam pair (e.g., when an interference measurement is configured over both a set of interfering transmission beams and a set of reception beams). In some examples, the one or more parameters may include a cell ID associated with a transmission beam (e.g., of the IAB node 405-*b* or the IAB node 405-*c*) or with a reception beam (e.g., of the IAB node 405-*a*). Such a cell ID may enable a reported transmission beam or reception beam to be associated with cells other than the serving cells between the wireless nodes, which may enable more accurate interference mitigation techniques (e.g., since a parent IAB node and a child IAB node may serve multiple cells).

In some examples, the report may be carried via one or more signaling mechanisms. For example, the report may be transmitted via L2 signaling (e.g., MAC CE). In some examples, the IAB node 405-*a* may be a parent node and may transmit the report via downlink MAC CE. In some examples, the IAB node 405-*a* may be a child node and may transmit the report via uplink MAC CE. Additionally, or alternatively, the report may be transmitted via L1 signaling (e.g., a physical channel). For example, the IAB node 405-*a* may be a parent node and transmit the report via PDCCH or PDSCH. In some examples, the IAB node 405-*a* may be a child node and transmit the report via PUCCH or PUSCH. Additionally, or alternatively, the IAB node 405-*a* may transmit the report via L3 signaling (e.g., RRC signaling or F1 AP signaling). For example, the IAB node 405-*b* may be a child node and receive the report indirectly (e.g., via one or more hops) from a parent node or a CU. In some examples, the IAB node 405-*a* may be a child node and may send an L3 report to the CU.

In some examples, the IAB node 405-*a* may refrain from transmitting a report. For example, the IAB node 405-*a* may perform interference measurements opportunistically and may not have determined some or all of the parameters to report (e.g., due to an availability or capability of the IAB node 405-*a*). In such examples, the IAB node 405-*a* may be configured to transmit a report (e.g., periodically or aperiodically) and may transmit an indication (e.g., in response to a request for the report) that the IAB node 405-*a* is unable to provide the report. In some other examples, the IAB node 405-a may perform interference measurements and may advertise (e.g., to the IAB node 405-b or to the IAB node 405-c) that the IAB node 405-a has a report for transmission. In such examples, the IAB node 405-a may transmit the report based on receiving a report configuration (e.g., from a CU), an uplink resource (e.g., from a parent node), a request (e.g., from a child node such as an MT), or any combination thereof.

In some examples, the IAB node 405-a may transmit other information as part of or in addition to the report. For example, the IAB node 405-a may transmit a channel state information (CSI) report for a serving transmission beam to of the IAB node 405-a and a report of the interference measurements for one or more interfering signals of other transmission beams. In some examples, the report may include an indication of the CSI report and an indication of the one or more interference measurements (e.g., of the other transmission beams carrying interfering signals). In some other examples, the CSI report may be transmitted separately from the indication of the one or more interference measurements. In some examples, the CSI report may include channel information, such as an RSRP, a signal-to-noise ratio (SINR), an associated resource index (e.g., an index of a CSI reference signal (RS) or a signal synchronization block (SSB)), a channel quality indicator (CQI), a pre-coding matrix indicator (PMI), a rank indicator (RI), a layer indicator (LI), or any combination thereof. The CSI report may be transmitted periodically (e.g., via PUCCH), semi-persistently (e.g., via PUCCH or PUSCH), or aperiodically (e.g., via PUSCH). In some examples, the CSI report may be transmitted from a child node (e.g., a child UE or a child MT) and a parent IAB node (e.g., a DU). Additionally, or alternatively, the other information may include a radio resource management (RRM) measurement report (e.g., as part of a handover procedure in the RRC layer). In some examples, the RRM measurement report may be transmitted from a child node (e.g., a UE or an MT) to a CU and the RRM measurement report may be transparent to the parent node (e.g., a DU). The RRM measurement report may include an indication of an RSRP, a SINR, a received signal received quality (RSRQ), an associated cell ID, a resource index (e.g., an index of a CS-RS or an SSB), or a combination thereof. The RRM measurement report may be periodic or event-triggered (e.g., a gNB may configure triggering thresholds for various events), and the report may include uplink RRC messages processed in the RRC layer.

At 435-a, the IAB node 405-b may schedule communications based on the report received at 430-a. For example, the IAB node 405-b may schedule communications in accordance with the report such that the effect of interference is reduced at a transmission beam of the IAB node 405-a, for example, by refraining from using or adjusting parameters of one or more transmission beams (e.g., interfering transmission beams of the IAB node 405-b or the IAB node 405-c, other interfering transmission beams that the IAB node 405-b may schedule, or transmission beams that the IAB node 405-b may be scheduled with by the IAB node 405-a).

Additionally, or alternatively, at 435-b the IAB node 405-c may schedule communications based on the report received at 430-b. For example, the IAB node 405-c may be an aggressor node with an interfering transmission beam and the IAB node 405-c may refrain from using or adjust one or more parameters of the interfering transmission beam based on the report indicating the interference measurements of the IAB node 405-a. In some examples, the IAB node 405-a may transmit the report to the IAB node 405-b and the IAB node 405-b may schedule communications with the IAB node 405-c in order to reduce the effects or likelihood of interference (e.g., when the IAB node 405-c is a child node or a parent of the IAB node 405-b, among other examples).

Figure 5:
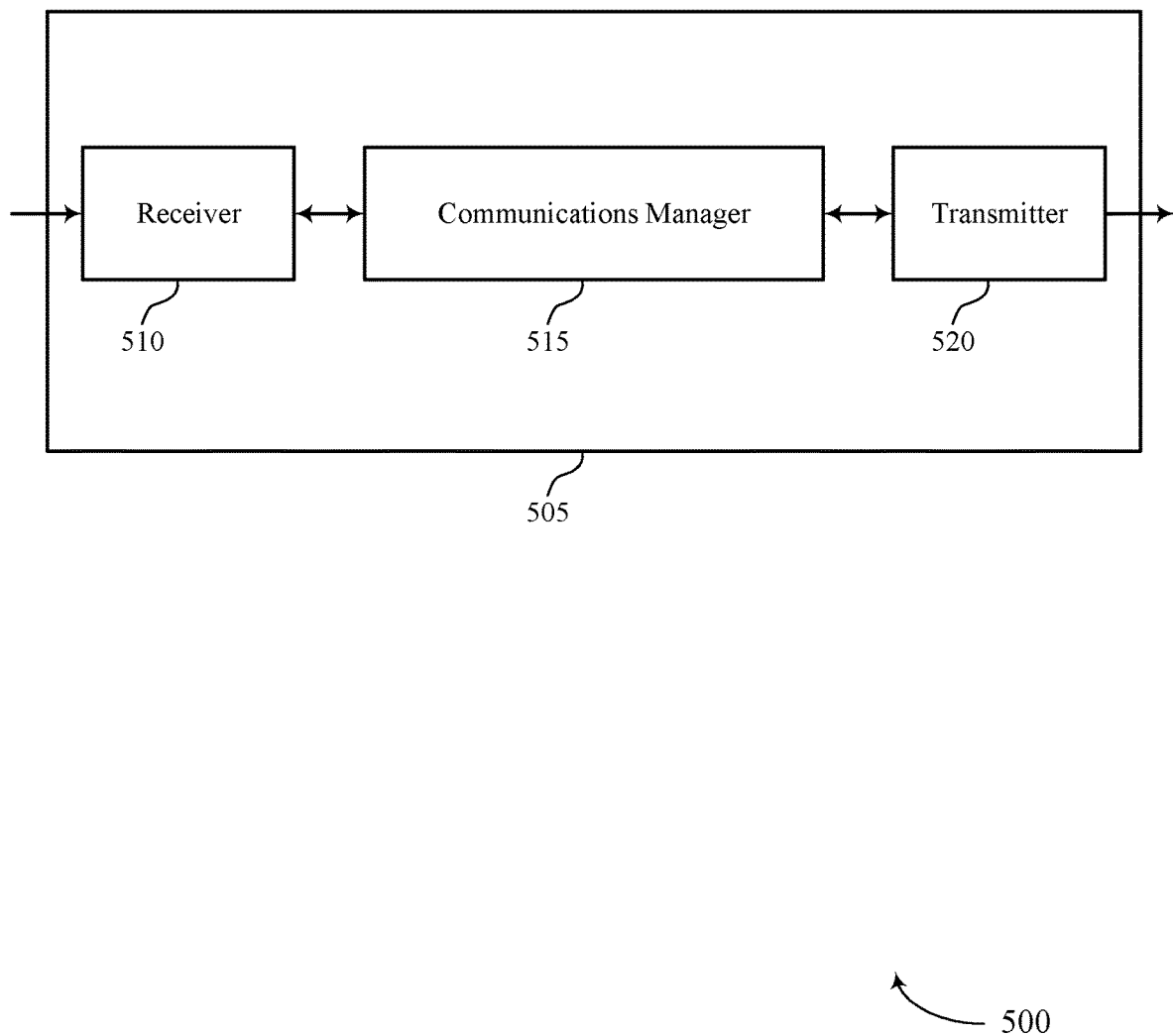
FIGS. 5 and 6 show block diagrams of devices that support measurement report techniques for wireless communications systems in accordance with aspects of the present disclosure.

FIG. 5 shows a block diagram 500 of a device 505 that supports measurement report techniques for wireless communications systems in accordance with aspects of the present disclosure. The device 505 may be an example of aspects of a wireless device as described herein. For example, the device 505 may be an example of or include the components of a wireless node (e.g., a base station 105, a network entity, a relay node 215, a donor node 210, a UE 115, a parent node, a child node, an IAB node 405, a victim wireless node, an aggressor wireless node, or any combination thereof). The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to measurement report techniques for wireless communications systems, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may establish a communications link with a second wireless node in the wireless communications system, where the second wireless node is a parent node or a child node of the first wireless node, receive, via a first reception beam of the first wireless node, an interfering signal from an aggressor wireless node in the wireless communications system, perform an interference measurement of the interfering signal at the first reception beam, and transmit, to the second wireless node, a report indicating the interference measurement. The communications manager 515 may also establish a communications link with a second wireless node in the wireless communications system, where the second wireless node is in a parent-child relationship with the first wireless node, receive, from the second wireless node, a report indicating an interference measurement that corresponds to an interfering signal from an aggressor wireless node at a first reception beam of the second wireless node, and schedule communications with the second wireless node, the aggressor wireless node, or both based on the received report. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the communications manager 515 as described herein may be implemented to realize one or more potential advantages. One implementation may enable a wireless device, such as a wireless node, to report interference measurements to another wireless node in a system (e.g., an IAB system). Such reporting may enable for interference mitigation techniques (e.g., scheduling based on the report), which may result in higher data rates and more efficient communications (e.g., less communication errors), among other advantages.

Based on implementing the reporting as described herein, a processor of a wireless node (e.g., a processor controlling the receiver 510, the communications manager 515, the transmitter 520, or a combination thereof) may reduce the impact or likelihood of interference in a communications system while ensuring relatively efficient communications. For example, the reporting techniques described herein may leverage a parent-child relationship between a victim wireless node and an aggressor wireless node to transmit the report over established communication links, which may realize reduced signaling overhead and power savings, among other benefits.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
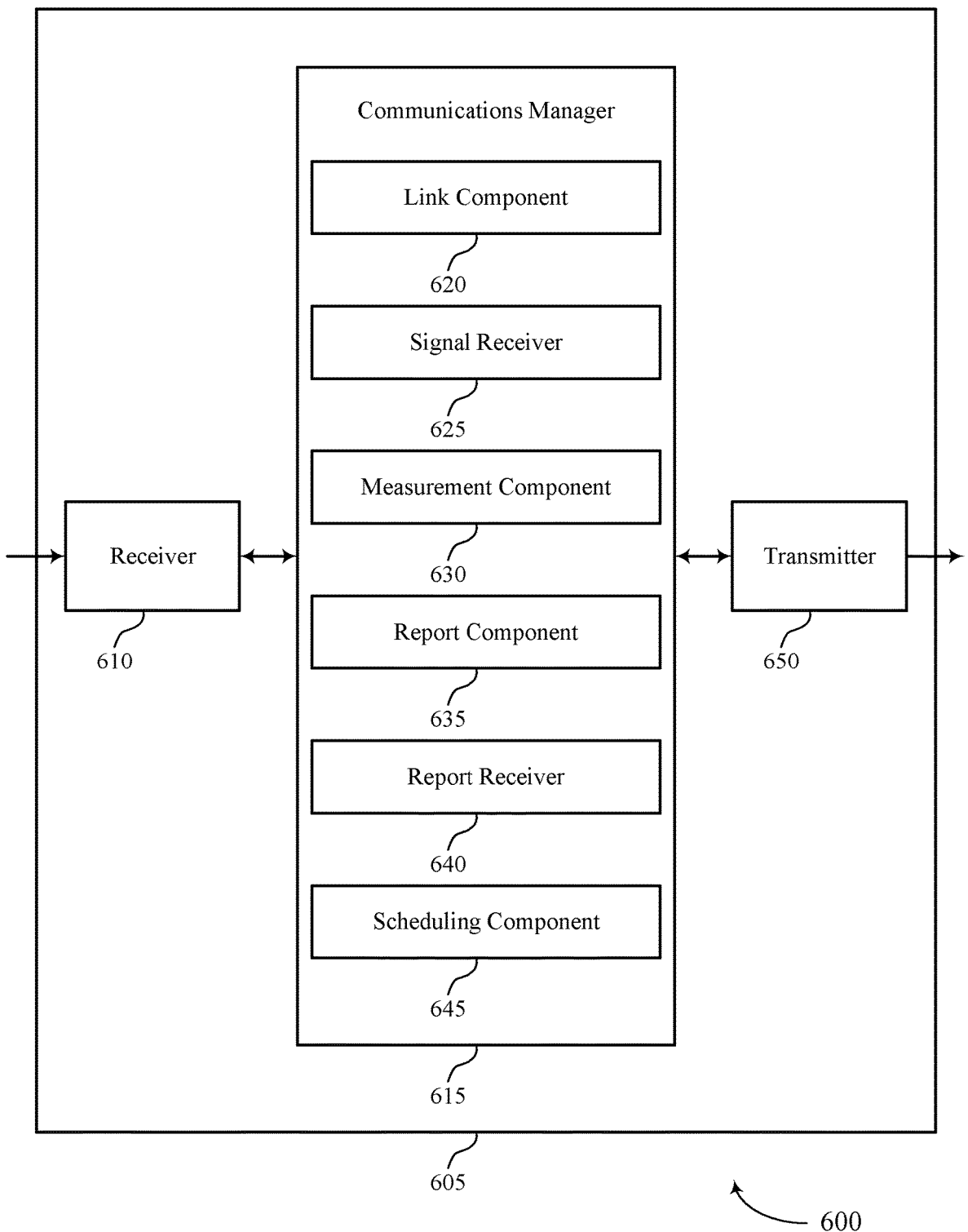

FIG. 6 shows a block diagram 600 of a device 605 that supports measurement report techniques for wireless communications systems in accordance with aspects of the present disclosure. The device 605 may be an example of aspects of a device 505 as described herein. For example, the device 605 may be an example of or include the components of a wireless node (e.g., a base station 105, a network entity, a relay node 215, a donor node 210, a UE 115, a parent node, a child node, an IAB node 405, a victim wireless node, an aggressor wireless node, or any combination thereof). The device 605 may include a receiver 610, a communications manager 615, and a transmitter 650. The device 605 may also include a processor. Each of these components may be in communication with one another (e.g., via one or more buses).

The receiver 610 may receive information such as packets, user data, or control information associated with various information channels (e.g., control channels, data channels, and information related to measurement report techniques for wireless communications systems, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a link component 620, a signal receiver 625, a measurement component 630, a report component 635, a report receiver 640, and a scheduling component 645. The communications manager 615 may be an example of aspects of the communications manager 810 described herein.

The link component 620 may establish a communications link with a second wireless node in the wireless communications system, where the second wireless node is a parent node or a child node of the first wireless node.

The signal receiver 625 may receive, via a first reception beam of the first wireless node, an interfering signal from an aggressor wireless node in the wireless communications system.

The measurement component 630 may perform an interference measurement of the interfering signal at the first reception beam.

The report component 635 may transmit, to the second wireless node, a report indicating the interference measurement.

The link component 620 may establish a communications link with a second wireless node in the wireless communications system, where the second wireless node is in a parent-child relationship with the first wireless node.

The report receiver 640 may receive, from the second wireless node, a report indicating an interference measurement that corresponds to an interfering signal from an aggressor wireless node at a first reception beam of the second wireless node.

The scheduling component 645 may schedule communications with the second wireless node, the aggressor wireless node, or both based on the received report.

The transmitter 650 may transmit signals generated by other components of the device 605. In some examples, the transmitter 650 may be collocated with a receiver 610 in a transceiver module. For example, the transmitter 650 may be an example of aspects of the transceiver 820 described with reference to FIG. 8. The transmitter 650 may utilize a single antenna or a set of antennas.

Figure 7:
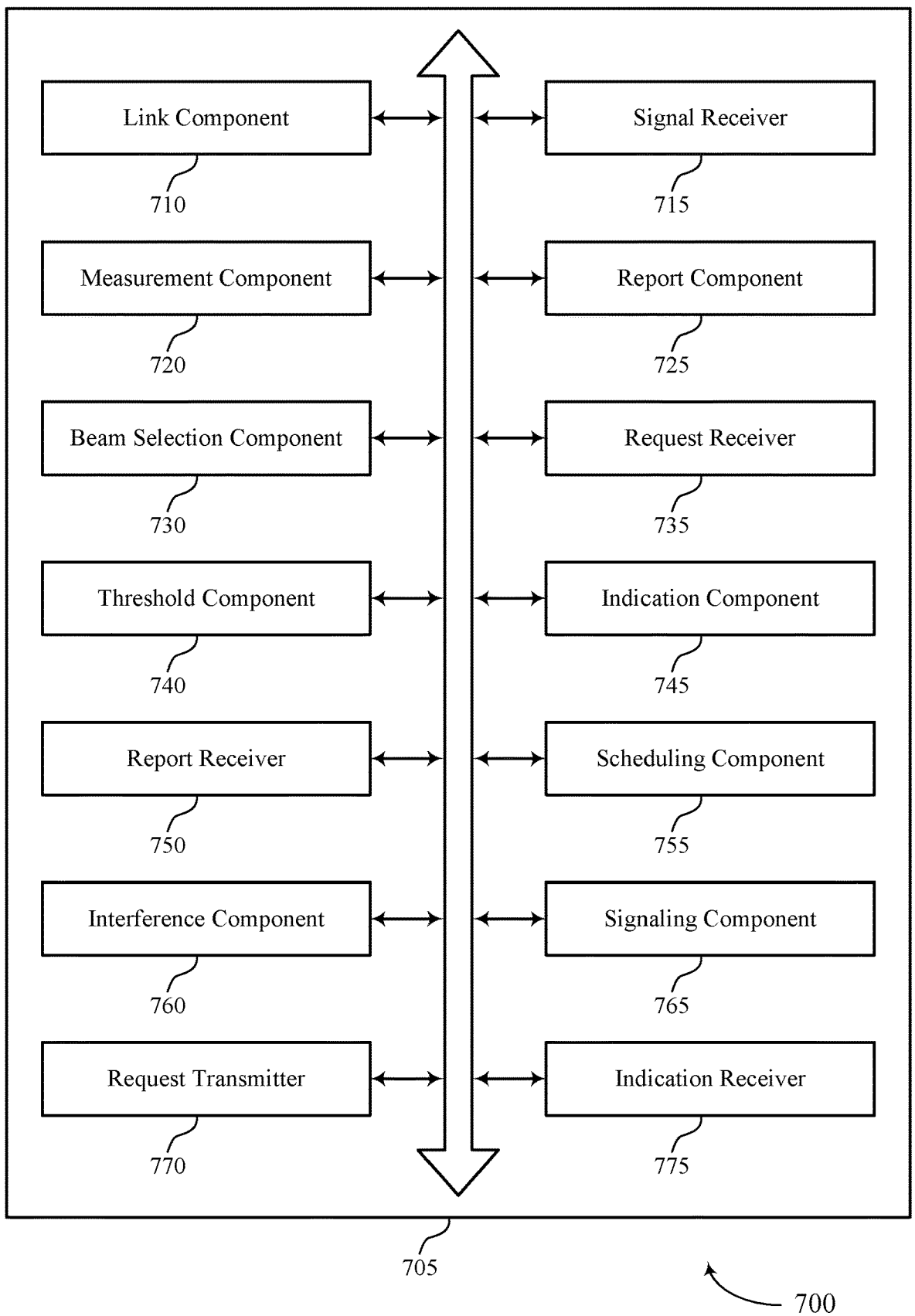
FIG. 7 shows a block diagram of a communications manager that supports measurement report techniques for wireless communications systems in accordance with aspects of the present disclosure.

FIG. 7 shows a block diagram 700 of a communications manager 705 that supports measurement report techniques for wireless communications systems in accordance with aspects of the present disclosure. The communications manager 705 may be an example of aspects of a communications manager 515, a communications manager 615, or a communications manager 810 described herein. The communications manager 705 may include a link component 710, a signal receiver 715, a measurement component 720, a report component 725, a beam selection component 730, a request receiver 735, a threshold component 740, an indication component 745, a report receiver 750, a scheduling component 755, an interference component 760, a signaling component 765, a request transmitter 770, and an indication receiver 775. Each of these modules may communicate, directly or indirectly, with one another (e.g., via one or more buses).

The link component 710 may establish a communications link with a second wireless node in the wireless communications system, where the second wireless node is in a parent-child relationship with the first wireless node (e.g., the second wireless node is a parent node or a child node of the first wireless node). In some cases, the second wireless node is the aggressor wireless node. In some cases, the aggressor wireless node is different than the second wireless node. In some cases, the first wireless node is the aggressor wireless node. In some cases, the aggressor wireless node is different than the first wireless node. In some cases, the second wireless node is a parent node or a child node of the first wireless node.

The signal receiver 715 may receive, via a first reception beam of the first wireless node, an interfering signal from an aggressor wireless node in the wireless communications system. In some examples, the signal receiver 715 may receive signaling indicating a configuration for the first wireless node, the signaling including RRC signaling or F1 AP signaling.

In some examples, the signal receiver 715 may receive a second signal corresponding to a serving transmission beam of the second wireless node, where the interfering signal corresponds to a beam different than the serving transmission beam.

The measurement component 720 may perform an interference measurement of the interfering signal at the first reception beam. In some examples, the measurement component 720 may refrain from performing an interference measurement for the second signal corresponding to the serving transmission beam.

In some examples, the measurement component 720 may determine one or more parameters of the interfering signal at the first reception beam, the one or more parameters including a transmission power, a RSRP, a RSSI, a cell ID, a beam index of the first reception beam, a beam index of a transmission beam associated with the interfering signal, an index of a beam pair including the first reception beam and the transmission beam, or any combination thereof.

The report component 725 may transmit, to the second wireless node, a report indicating the interference measurement. In some cases, the report indicates the one or more parameters. In some examples, the report component 725 may generate the report indicating the interference measurement based on the selected set of beam pairs. In some examples, the report component 725 may generate a matrix of interference measurements corresponding to the set of beam pairs, where the report indicates the matrix of interference measurements. In some examples, the report component 725 may transmit the report based on the configuration.

In some examples, the report component 725 may transmit the report using layer 1 signaling, layer 2 signaling, layer 3 signaling, or a combination thereof.

The report receiver 750 may receive, from the second wireless node, a report indicating an interference measurement that corresponds to an interfering signal from an aggressor wireless node at a first reception beam of the second wireless node.

In some examples, the report receiver 750 may receive the report based on the configuration.

In some examples, the report receiver 750 may receive the report from the second wireless node in response to the request.

In some examples, the report receiver 750 may receive the report via layer 1 signaling, layer 2 signaling, layer 3 signaling, or a combination thereof.

In some cases, the received report indicates one or more parameters of at least the interfering signal at the first reception beam, the one or more parameters including a transmission power, a RSRP, a RSSI, a cell ID, a beam index of the first reception beam, a beam index of a transmission beam associated with the interfering signal, an index of a beam pair including the first reception beam and the transmission beam, or any combination thereof.

In some cases, the received report indicates one or more interference measurements for a set of beam pairs of the second wireless node and the aggressor wireless node, the set of beam pairs including a set of reception beams of the second wireless node and a set of transmission beams of the aggressor wireless node, where the set of reception beams includes the first reception beam and the set of transmission beams includes a transmission beam corresponding to the interfering signal.

The scheduling component 755 may schedule communications with the second wireless node, the aggressor wireless node, or both based on the received report.

The beam selection component 730 may select a set of beam pairs of the first wireless node and the aggressor wireless node, the set of beam pairs including a set of reception beams of the first wireless node and a set of transmission beams of the aggressor wireless node, where the set of reception beams includes the first reception beam and the set of transmission beams includes a transmission beam corresponding to the interfering signal.

In some examples, the beam selection component 730 may select the set of beam pairs based on the configuration.

In some examples, the beam selection component 730 may determine that one or more results of the interference measurement of the selected set of beam pairs satisfy a threshold, where results of each of the selected set of beam pairs satisfy the threshold.

In some examples, the beam selection component 730 may values of the results of each of the selected set of beam pairs are less than or equal to a value of the threshold.

In some examples, the beam selection component 730 may values of the results of each of the selected set of beam pairs are greater than or equal to a value of the threshold.

In some cases, the set of beam pairs includes all of a set of possible beam pairs associated with the first wireless node.

In some cases, the set of beam pairs includes a subset of reception beams of the set of reception beams of the first wireless node, where the subset of reception beams is associated with one or more backhaul links of the first wireless node.

In some cases, the set of beam pairs includes a subset of reception beams of the set of reception beams of the first wireless node, where the subset of reception beams are candidates for scheduling by the aggressor wireless node.

In some cases, the set of beam pairs includes a subset of reception beams of the set of reception beams of the first wireless node, where the subset of reception beams are candidates for scheduling by the second wireless node.

The request receiver 735 may receive a request for the report from the second wireless node or the aggressor wireless node. In some examples, the report component 725 may transmit the report in response to the request. In some examples, the request receiver 735 may receive the request for the report via a downlink MAC CE, a PDCCH, DCI, or any combination thereof. In some examples, the request receiver 735 may receive the request for the report via an uplink MAC CE, a PUCCH, UCI, or any combination thereof.

In some examples, the request receiver 735 may receive, from the second wireless node, an indication to provide a second report. In some examples, the indication component 745 may transmit a response to the second wireless node indicating that the first wireless node is unable to transmit the second report.

The threshold component 740 may determine that a result of the interference measurement satisfies a threshold. In some examples, the report component 725 may transmit the report based on the result satisfying the threshold, where the report indicates the result of the interference measurement.

The indication component 745 may send an indication to the second wireless node that the first wireless node has the report indicating the interference measurement available for transmission.

In some examples, the indication component 745 may transmit a response to the second wireless node indicating that the first wireless node is unable to transmit the second report.

The interference component 760 may determine, based on the received report, a matrix of interference measurements corresponding to the set of beam pairs, where scheduling communications includes selecting one or more of the set of beam pairs based on the matrix of interference measurements. In some cases, the set of beam pairs includes all of a set of possible beam pairs associated with the second wireless node. In some cases, the set of beam pairs includes a subset of reception beams of the set of reception beams of the second wireless node, where the subset of reception beams is associated with one or more backhaul links of the second wireless node. In some cases, the set of beam pairs includes a subset of reception beams of the set of reception beams of the second wireless node, where the subset of reception beams are candidates for scheduling by the aggressor wireless node. In some cases, the set of beam pairs includes a subset of reception beams of the set of reception beams of the second wireless node, where the subset of reception beams are candidates for scheduling by the first wireless node.

The signaling component 765 may receive (e.g., from a CU of the wireless communications system when the first wireless node is a parent of the second wireless node), signaling configuring the second wireless node to select the set of beam pairs, the signaling including RRC signaling or F1 AP signaling. In some examples, the signaling component 765 may forward, to the second wireless node, the signaling configuring the second wireless node to select the set of beam pairs.

In some examples, the signaling component 765 may transmit a second signal corresponding to a serving transmission beam of the first wireless node, where the interfering signal corresponds to a beam different than the serving transmission beam.

In some examples, the signaling component 765 may receive signaling indicating a configuration for the second wireless node, the signaling including RRC signaling or F1 AP signaling. In some cases, the set of beam pairs excludes the serving transmission beam.

The request transmitter 770 may transmit, to the second wireless node, a request for the report. In some examples, the request transmitter 770 may transmit the request for the report via a downlink MAC CE, a PDCCH, DCI, or any combination thereof. In some examples, the request transmitter 770 may transmit the request for the report via an uplink MAC CE, a PUCCH, UCI, or any combination thereof. In some examples, the request transmitter 770 may transmit, to the second wireless node, an indication to provide a second report.

The indication receiver 775 may receive an indication that the second wireless node has the report indicating the interference measurement available for transmission. In some examples, the indication receiver 775 may receive a response from the second wireless node indicating that the second wireless node is unable to transmit the second report.

Figure 8:
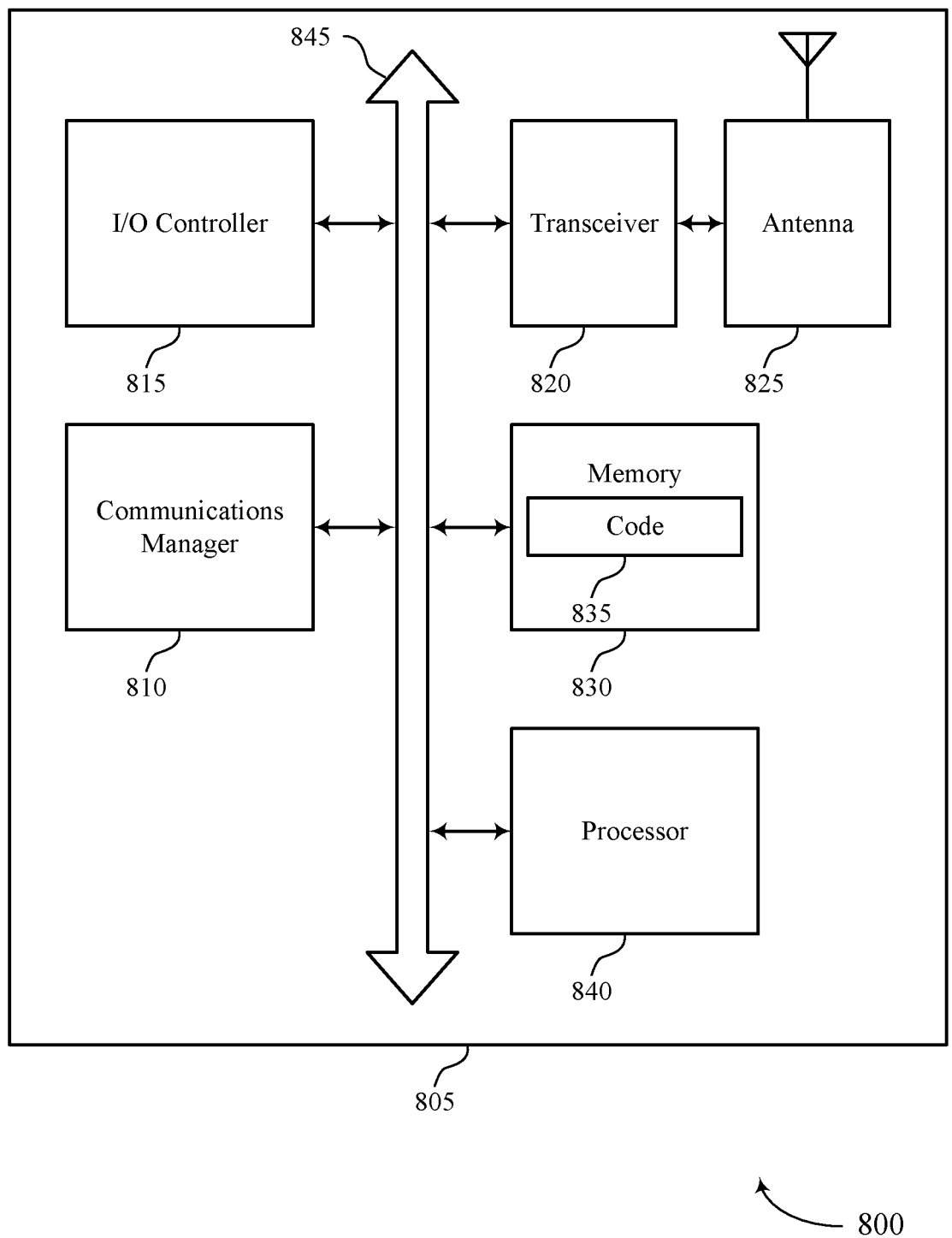
FIG. 8 shows a diagram of a system including a device that supports measurement report techniques for wireless communications systems in accordance with aspects of the present disclosure.

FIG. 8 shows a diagram of a system 800 including a device 805 that supports measurement report techniques for wireless communications systems in accordance with aspects of the present disclosure. The device 805 may be an example of or include the components of device 505, device 605, or a device as described herein. For example, the device 805 may be an example of a wireless node (e.g., a base station 105, a network entity, a relay node 215, a donor node 210, a UE 115, a parent node, a child node, an IAB node 405, a victim wireless node, an aggressor wireless node, or any combination thereof). The device 805 may include components for bi-directional voice and data communications including components for transmitting and receiving communications, including a communications manager 810, an I/O controller 815, a transceiver 820, an antenna 825, memory 830, a processor 840, and a coding manager 850. These components may be in electronic communication via one or more buses (e.g., bus 845).

The communications manager 810 may establish a communications link with a second wireless node in the wireless communications system, where the second wireless node is a parent node or a child node of the first wireless node, receive, via a first reception beam of the first wireless node, an interfering signal from an aggressor wireless node in the wireless communications system, perform an interference measurement of the interfering signal at the first reception beam, and transmit, to the second wireless node, a report indicating the interference measurement. The communications manager 810 may also establish a communications link with a second wireless node in the wireless communications system, where the second wireless node is in a parent-child relationship with the first wireless node, receive, from the second wireless node, a report indicating an interference measurement that corresponds to an interfering signal from an aggressor wireless node at a first reception beam of the second wireless node, and schedule communications with the second wireless node, the aggressor wireless node, or both based on the received report.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a digital signal processor (DSP), a CPU, a microcontroller, an ASIC, a field programmable gate array (FPGA), a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting measurement report techniques for wireless communications systems).

The code 835 may include instructions to implement aspects of the present disclosure, including instructions to support wireless communications at a first wireless node in a wireless communications system. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
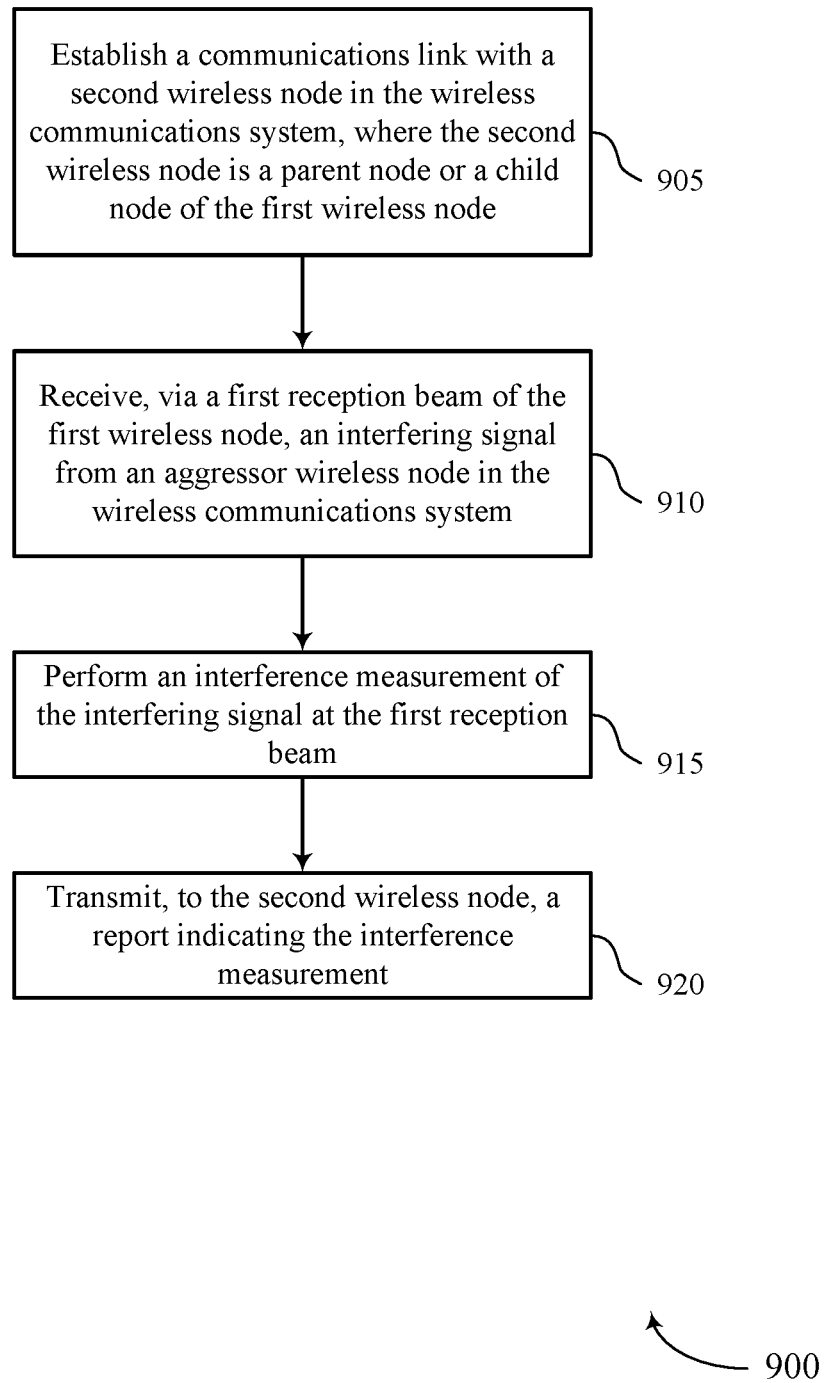
FIGS. 9 through 11 show flowcharts illustrating methods that support measurement report techniques for wireless communications systems in accordance with aspects of the present disclosure.

FIG. 9 shows a flowchart illustrating a method 900 that supports measurement report techniques for wireless communications systems in accordance with aspects of the present disclosure. The operations of method 900 may be implemented by a device or its components as described herein. For example, the operations of method 900 may be performed by a communications manager as described with reference to FIGS. 5 through 8. In some examples, a device may execute a set of instructions to control the functional elements of the device to perform the functions described herein. Additionally, or alternatively, a device may perform aspects of the functions described herein using special-purpose hardware.

At 905, the device may establish a communications link with a second wireless node in the wireless communications system, where the second wireless node is a parent node or a child node of the first wireless node. The operations of 905 may be performed according to the methods described herein. In some examples, aspects of the operations of 905 may be performed by a link component as described with reference to FIGS. 5 through 8.

At 910, the device may receive, via a first reception beam of the first wireless node, an interfering signal from an aggressor wireless node in the wireless communications system. The operations of 910 may be performed according to the methods described herein. In some examples, aspects of the operations of 910 may be performed by a signal receiver as described with reference to FIGS. 5 through 8.

At 915, the device may perform an interference measurement of the interfering signal at the first reception beam. The operations of 915 may be performed according to the methods described herein. In some examples, aspects of the operations of 915 may be performed by a measurement component as described with reference to FIGS. 5 through 8.

At 920, the device may transmit, to the second wireless node, a report indicating the interference measurement. The operations of 920 may be performed according to the methods described herein. In some examples, aspects of the operations of 920 may be performed by a report component as described with reference to FIGS. 5 through 8.

Figure 10:
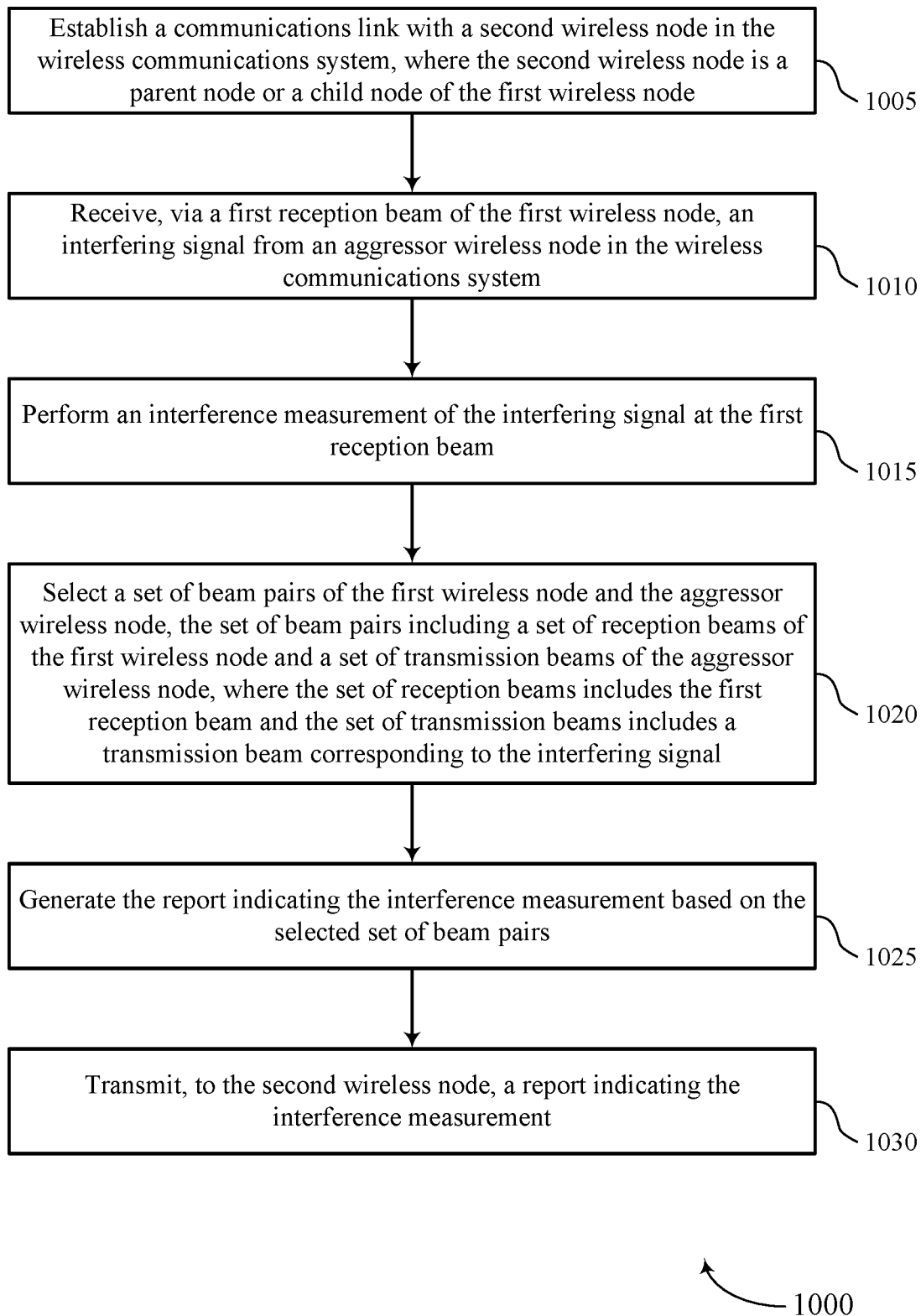

FIG. 10 shows a flowchart illustrating a method 1000 that supports measurement report techniques for wireless communications systems in accordance with aspects of the present disclosure. The operations of method 1000 may be implemented by a device or its components as described herein. For example, the operations of method 1000 may be performed by a communications manager as described with reference to FIGS. 5 through 8. In some examples, a device may execute a set of instructions to control the functional elements of the device to perform the functions described herein. Additionally, or alternatively, a device may perform aspects of the functions described herein using special-purpose hardware.

At 1005, the device may establish a communications link with a second wireless node in the wireless communications system, where the second wireless node is a parent node or a child node of the first wireless node. The operations of 1005 may be performed according to the methods described herein. In some examples, aspects of the operations of 1005 may be performed by a link component as described with reference to FIGS. 5 through 8.

At 1010, the device may receive, via a first reception beam of the first wireless node, an interfering signal from an aggressor wireless node in the wireless communications system. The operations of 1010 may be performed according to the methods described herein. In some examples, aspects of the operations of 1010 may be performed by a signal receiver as described with reference to FIGS. 5 through 8.

At 1015, the device may perform an interference measurement of the interfering signal at the first reception beam. The operations of 1015 may be performed according to the methods described herein. In some examples, aspects of the operations of 1015 may be performed by a measurement component as described with reference to FIGS. 5 through 8.

At 1020, the device may select a set of beam pairs of the first wireless node and the aggressor wireless node, the set of beam pairs including a set of reception beams of the first wireless node and a set of transmission beams of the aggressor wireless node, where the set of reception beams includes the first reception beam and the set of transmission beams includes a transmission beam corresponding to the interfering signal. The operations of 1020 may be performed according to the methods described herein. In some examples, aspects of the operations of 1020 may be performed by a beam selection component as described with reference to FIGS. 5 through 8.

At 1025, the device may generate the report indicating the interference measurement based on the selected set of beam pairs. The operations of 1025 may be performed according to the methods described herein. In some examples, aspects of the operations of 1025 may be performed by a report component as described with reference to FIGS. 5 through 8.

At 1030, the device may transmit, to the second wireless node, a report indicating the interference measurement. The operations of 1030 may be performed according to the methods described herein. In some examples, aspects of the operations of 1030 may be performed by a report component as described with reference to FIGS. 5 through 8.

Figure 11:
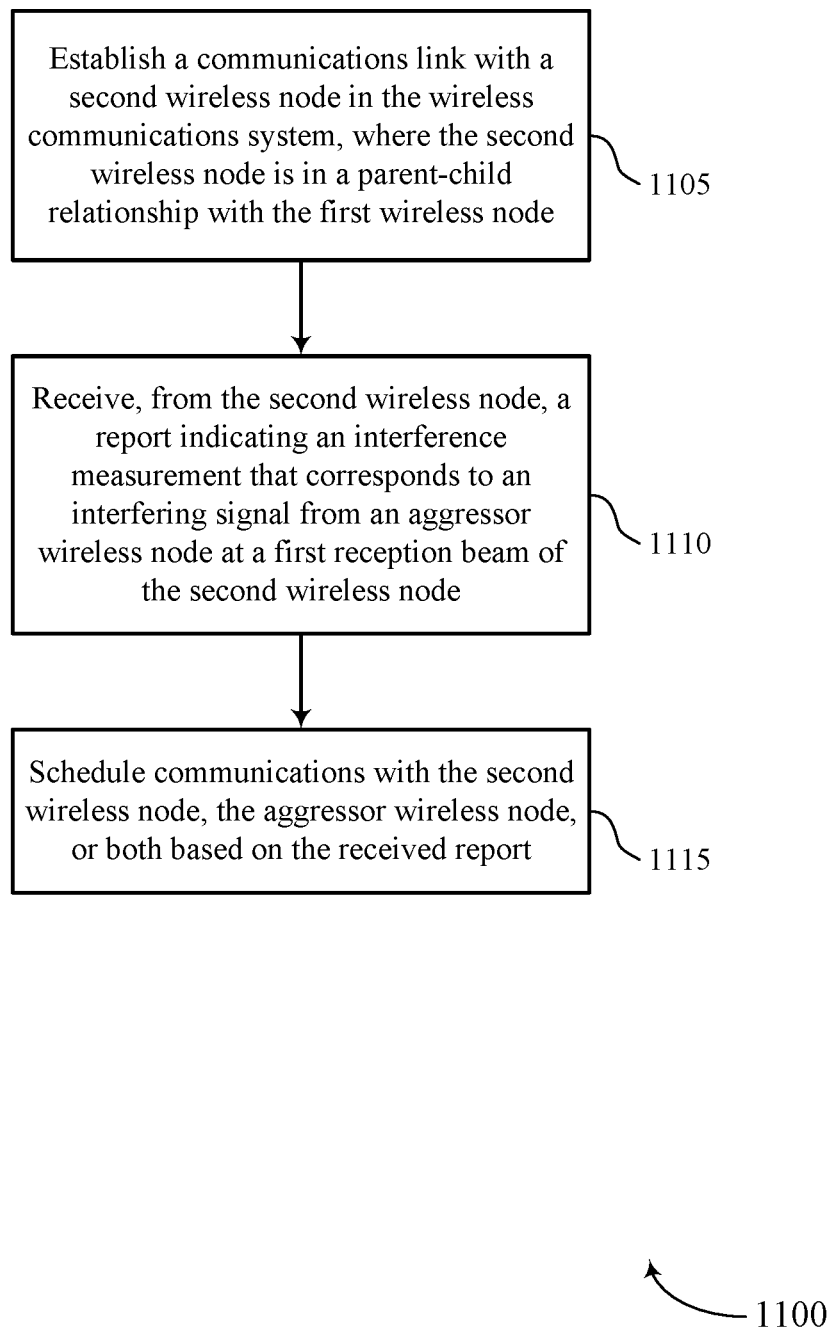

FIG. 11 shows a flowchart illustrating a method 1100 that supports measurement report techniques for wireless communications systems in accordance with aspects of the present disclosure. The operations of method 1100 may be implemented by a device or its components as described herein. For example, the operations of method 1100 may be performed by a communications manager as described with reference to FIGS. 5 through 8. In some examples, a device may execute a set of instructions to control the functional elements of the device to perform the functions described herein. Additionally, or alternatively, a device may perform aspects of the functions described herein using special-purpose hardware.

At 1105, the device may establish a communications link with a second wireless node in the wireless communications system, where the second wireless node is in a parent-child relationship with the first wireless node. The operations of 1105 may be performed according to the methods described herein. In some examples, aspects of the operations of 1105 may be performed by a link component as described with reference to FIGS. 5 through 8.

At 1110, the device may receive, from the second wireless node, a report indicating an interference measurement that corresponds to an interfering signal from an aggressor wireless node at a first reception beam of the second wireless node. The operations of 1110 may be performed according to the methods described herein. In some examples, aspects of the operations of 1110 may be performed by a report receiver as described with reference to FIGS. 5 through 8.

At 1115, the device may schedule communications with the second wireless node, the aggressor wireless node, or both based on the received report. The operations of 1115 may be performed according to the methods described herein. In some examples, aspects of the operations of 1115 may be performed by a scheduling component as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a first wireless node in a wireless communications system, comprising: establishing a communications link with a second wireless node in the wireless communications system, wherein the second wireless node is a parent node or a child node of the first wireless node; receiving, via a first reception beam of the first wireless node, an interfering signal from an aggressor wireless node in the wireless communications system; performing an interference measurement of the interfering signal at the first reception beam; and transmitting, to the second wireless node, a report indicating the interference measurement.

Aspect 2: The method of aspect 1, wherein performing the interference measurement comprises: determining one or more parameters of the interfering signal at the first reception beam, the one or more parameters comprising a transmission power, a reference signal received power (RSRP), a received signal strength indicator (RSSI), a cell identifier, a beam index of the first reception beam, a beam index of a transmission beam associated with the interfering signal, an index of a beam pair comprising the first reception beam and the transmission beam, or any combination thereof, wherein the report indicates the one or more parameters.

Aspect 3: The method of any of aspects 1 through 2, further comprising: selecting a set of beam pairs of the first wireless node and the aggressor wireless node, the set of beam pairs comprising a set of reception beams of the first wireless node and a set of transmission beams of the aggressor wireless node, wherein the set of reception beams comprises the first reception beam and the set of transmission beams comprises a transmission beam corresponding to the interfering signal; and generating the report indicating the interference measurement based on the selected set of beam pairs.

Aspect 4: The method of aspect 3, wherein generating the report comprises: generating a matrix of interference measurements corresponding to the set of beam pairs, wherein the report indicates the matrix of interference measurements.

Aspect 5: The method of any of aspects 3 through 4, further comprising: receiving signaling indicating a configuration for the first wireless node, the signaling comprising RRC signaling or F1 application protocol (AP) signaling; and selecting the set of beam pairs based at least in part on the configuration.

Aspect 6: The method of any of aspects 3 through 5, wherein the set of beam pairs comprises all of a set of possible beam pairs associated with the first wireless node.

Aspect 7: The method of any of aspects 3 through 6, wherein selecting the set of beam pairs comprises: determining that one or more results of the interference measurement of the selected set of beam pairs satisfy a threshold, wherein results of each of the selected set of beam pairs satisfy the threshold.

Aspect 8: The method of any of aspects 3 through 7, wherein the set of beam pairs comprises a subset of reception beams of the set of reception beams of the first wireless node, the subset of reception beams is associated with one or more backhaul links of the first wireless node.

Aspect 9: The method of any of aspects 3 through 8, wherein the set of beam pairs comprises a subset of reception beams of the set of reception beams of the first wireless node, the subset of reception beams are candidates for scheduling by the aggressor wireless node or the second wireless node.

Aspect 10: The method of any of aspects 1 through 9, further comprising: receiving a second signal corresponding to a serving transmission beam of the second wireless node, wherein the interfering signal corresponds to a beam different than the serving transmission beam.

Aspect 11: The method of aspect 10, further comprising: refraining from performing an interference measurement for the second signal corresponding to the serving transmission beam.

Aspect 12: The method of any of aspects 1 through 11, further comprising: receiving signaling indicating a configuration for the first wireless node, the signaling comprising RRC signaling or F1 application protocol (AP) signaling; and transmitting the report based at least in part on the configuration.

Aspect 13: The method of any of aspects 1 through 12, further comprising: receiving a request for the report from the second wireless node or the aggressor wireless node; and transmitting the report in response to the request.

Aspect 14: The method of any of aspects 1 through 13, further comprising: determining that a result of the interference measurement satisfies a threshold; and transmitting the report based at least in part on the result satisfying the threshold, wherein the report indicates the result of the interference measurement.

Aspect 15: The method of any of aspects 1 through 14, further comprising: transmitting an indication to the second wireless node that the first wireless node has the report indicating the interference measurement available for transmission.

Aspect 16: The method of any of aspects 1 through 15, further comprising: receiving, from the second wireless node, an indication to provide a second report; and transmitting a response to the second wireless node indicating that the first wireless node is unable to transmit the second report.

Aspect 17: A method for wireless communications at a first wireless node in a wireless communications system, comprising: establishing a communications link with a second wireless node in the wireless communications system, wherein the second wireless node is in a parent-child relationship with the first wireless node; receiving, from the second wireless node, a report indicating an interference measurement that corresponds to an interfering signal from an aggressor wireless node at a first reception beam of the second wireless node; and scheduling communications with the second wireless node, the aggressor wireless node, or both based at least in part on the received report.

Aspect 18: The method of aspect 17, wherein the received report indicates one or more parameters of at least the interfering signal at the first reception beam, the one or more parameters comprising a transmission power, a reference signal received power (RSRP), a received signal strength indicator (RSSI), a cell identifier, a beam index of the first reception beam, a beam index of a transmission beam associated with the interfering signal, an index of a beam pair comprising the first reception beam and the transmission beam, or any combination thereof.

Aspect 19: The method of any of aspects 17 through 18, wherein the received report indicates one or more interference measurements for a set of beam pairs of the second wireless node and the aggressor wireless node, the set of beam pairs comprising a set of reception beams of the second wireless node and a set of transmission beams of the aggressor wireless node, the set of reception beams comprises the first reception beam and the set of transmission beams comprises a transmission beam corresponding to the interfering signal.

Aspect 20: The method of aspect 19, further comprising: determining, based at least in part on the received report, a matrix of interference measurements corresponding to the set of beam pairs, wherein scheduling communications comprises selecting one or more of the set of beam pairs based at least in part on the matrix of interference measurements.

Aspect 21: The method of any of aspects 19 through 20, further comprising: receiving signaling configuring the second wireless node to select the set of beam pairs, the signaling comprising RRC signaling or F1 application protocol (AP) signaling.

Aspect 22: The method of any of aspects 19 through 21, wherein the set of beam pairs comprises all of a set of possible beam pairs associated with the second wireless node.

Aspect 23: The method of any of aspects 19 through 22, wherein the set of beam pairs comprises a subset of reception beams of the set of reception beams of the second wireless node, the subset of reception beams is associated with one or more backhaul links of the second wireless node.

Aspect 24: The method of any of aspects 19 through 23, wherein the set of beam pairs comprises a subset of reception beams of the set of reception beams of the second wireless node, the subset of reception beams are candidates for scheduling by the aggressor wireless node.

Aspect 25: The method of any of aspects 19 through 24, wherein the set of beam pairs comprises a subset of reception beams of the set of reception beams of the second wireless node, the subset of reception beams are candidates for scheduling by the first wireless node.

Aspect 26: The method of any of aspects 19 through 25, further comprising: transmitting a second signal corresponding to a serving transmission beam of the first wireless node, wherein the interfering signal corresponds to a beam different than the serving transmission beam.

Aspect 27: The method of aspect 26, wherein the set of beam pairs excludes the serving transmission beam.

Aspect 28: The method of any of aspects 17 through 27, further comprising: receiving signaling indicating a configuration for the second wireless node, the signaling comprising RRC signaling or F1 application protocol (AP) signaling; and receiving the report based at least in part on the configuration.

Aspect 29: An apparatus for wireless communications at a first wireless node in a wireless communications system, comprising a processor; memory coupled with the processor; and instructions stored in the memory and executable by the processor to cause the apparatus to perform a method of any of aspects 1 through 16.

Aspect 30: An apparatus for wireless communications at a first wireless node in a wireless communications system, comprising at least one means for performing a method of any of aspects 1 through 16.

Aspect 31: A non-transitory computer-readable medium storing code for wireless communications at a first wireless node in a wireless communications system, the code comprising instructions executable by a processor to perform a method of any of aspects 1 through 16.

Aspect 32: An apparatus for wireless communications at a first wireless node in a wireless communications system, comprising a processor; memory coupled with the processor; and instructions stored in the memory and executable by the processor to cause the apparatus to perform a method of any of aspects 17 through 28.

Aspect 33: An apparatus for wireless communications at a first wireless node in a wireless communications system, comprising at least one means for performing a method of any of aspects 17 through 28.

Aspect 34: A non-transitory computer-readable medium storing code for wireless communications at a first wireless node in a wireless communications system, the code comprising instructions executable by a processor to perform a method of any of aspects 17 through 28.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," "component," and the like may not be a substitute for the word "means." As such, no claim element is to be construed as a means plus function unless the element is expressly recited using the phrase "means for.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means at least one of A, B, or C, or any combination thereof. Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first wireless node in a wireless communications system, comprising:
    establishing a communications link with a second wireless node in the wireless communications system, wherein the second wireless node is a parent node or a child node of the first wireless node;
    receiving, via a reception beam of the first wireless node, an interfering signal from an aggressor wireless node in the wireless communications system;

performing an interference measurement of the interfering signal at the reception beam to obtain a beam index of a transmission beam associated with the interfering signal, a beam index of the reception beam, or both;

receiving, from the second wireless node or the aggressor wireless node, a downlink medium access control (MAC) control element (CE) comprising a request for an interference measurement report; and transmitting, in response to the request received in the downlink MAC CE, an uplink MAC CE comprising the interference measurement report indicating the interference measurement for scheduling subsequent communications for the first wireless node and indicating the beam index of the transmission beam associated with the interfering signal, the beam index of the reception beam, or both.

2. The method of claim 1, wherein performing the interference measurement comprises:

determining one or more parameters of the interfering signal at the reception beam, the one or more parameters comprising a transmission power, a reference signal received power (RSRP), a received signal strength indicator (RSSI), a cell identifier, the beam index of the reception beam, or any combination thereof, wherein the interference measurement report indicates the one or more parameters.

3. The method of claim 1, further comprising:

selecting a set of beam pairs of the first wireless node and the aggressor wireless node, the set of beam pairs comprising a set of reception beams of the first wireless node and a set of transmission beams of the aggressor wireless node, wherein the set of reception beams comprises the reception beam and the set of transmission beams comprises the transmission beam corresponding to the interfering signal; and generating the interference measurement report indicating the interference measurement based on the selected set of beam pairs.

4. The method of claim 1, further comprising:

receiving a second signal corresponding to a serving transmission beam of the second wireless node, wherein the interfering signal corresponds to a beam different than the serving transmission beam.

5. The method of claim 1, further comprising:

receiving signaling indicating a configuration for the first wireless node, the signaling comprising radio resource control (RRC) signaling or F1 application protocol (AP) signaling; and transmitting the interference measurement report based at least in part on the configuration.

6. The method of claim 1, further comprising:

determining that a result of the interference measurement satisfies a threshold; and transmitting the interference measurement report based at least in part on the result satisfying the threshold, wherein the interference measurement report indicates the result of the interference measurement.

7. The method of claim 1, further comprising:

transmitting an indication to the second wireless node that the first wireless node has the interference measurement report indicating the interference measurement available for transmission.

8. The method of claim 1, further comprising:

receiving, from the second wireless node, an indication to provide a second report; and transmitting a response to the second wireless node indicating that the first wireless node is unable to transmit the second report.

9. The method of claim 3, wherein generating the interference measurement report comprises:

generating a matrix of interference measurements corresponding to the set of beam pairs, wherein the interference measurement report indicates the matrix of the interference measurements.

10. The method of claim 3, further comprising:

receiving signaling indicating a configuration for the first wireless node, the signaling comprising radio resource control (RRC) signaling or F1 application protocol (AP) signaling; and selecting the set of beam pairs based at least in part on the configuration.

11. The method of claim 3, wherein the set of beam pairs comprises all of a set of possible beam pairs associated with the first wireless node.

12. The method of claim 3, wherein selecting the set of beam pairs comprises:

determining that one or more results of the interference measurement of the selected set of beam pairs satisfy a threshold, wherein results of each of the selected set of beam pairs satisfy the threshold.

13. The method of claim 3, wherein the set of beam pairs comprises a subset of reception beams of the set of reception beams of the first wireless node, wherein the subset of reception beams is associated with one or more backhaul links of the first wireless node.

14. The method of claim 3, wherein the set of beam pairs comprises a subset of reception beams of the set of reception beams of the first wireless node, wherein the subset of reception beams are candidates for scheduling by the aggressor wireless node or the second wireless node.

15. The method of claim 4, further comprising:

refraining from performing the interference measurement for the second signal corresponding to the serving transmission beam.

16. A method for wireless communications at a first wireless node in a wireless communications system, comprising:

establishing a communications link with a second wireless node in the wireless communications system, wherein the second wireless node is in a parent-child relationship with the first wireless node;

transmitting, to the second wireless node or an aggressor wireless node, a downlink medium access control (MAC) control element (CE) comprising a request for an interference measurement report;

receiving, after transmitting the request in the downlink MAC CE, an uplink MAC CE comprising the interference measurement report indicating an interference measurement for scheduling subsequent communications for the second wireless node and indicating a beam index of a transmission beam associated with an interfering signal, a beam index of a reception beam of the second wireless node, or both, wherein the interference measurement corresponds to the interfering signal from the aggressor wireless node at the reception beam of the second wireless node; and scheduling the subsequent communications with the second wireless node, the aggressor wireless node, or both based at least in part on receiving the interference measurement report that indicates the interference measurement and indicates the beam index of the transmission beam associated with the interfering signal, the beam index of the reception beam of the second wireless node, or both.

17. The method of claim 16, wherein the interference measurement report indicates one or more parameters of at least the interfering signal at the reception beam, the one or more parameters comprising a transmission power, a reference signal received power (RSRP), a received signal strength indicator (RSSI), a cell identifier, or any combination thereof, wherein the interference measurement report indicates the one or more parameters.

18. The method of claim 16, wherein the interference measurement report indicates one or more interference measurements for a set of beam pairs of the second wireless node and the aggressor wireless node, the set of beam pairs comprising a set of reception beams of the second wireless node and a set of transmission beams of the aggressor wireless node, wherein the set of reception beams comprises the reception beam and the set of transmission beams comprises the transmission beam corresponding to the interfering signal.

19. The method of claim 16, further comprising:
receiving signaling indicating a configuration for the second wireless node, the signaling comprising radio resource control (RRC) signaling or F1 application protocol (AP) signaling; and
receiving the interference measurement report based at least in part on the configuration.

20. The method of claim 18, further comprising:
determining, based at least in part on receiving the interference measurement report, a matrix of interference measurements corresponding to the set of beam pairs, wherein scheduling the subsequent communications comprises selecting one or more of the set of beam pairs based at least in part on the matrix of interference measurements.

21. The method of claim 18, further comprising:
receiving signaling configuring the second wireless node to select the set of beam pairs, the signaling comprising radio resource control (RRC) signaling or F1 application protocol (AP) signaling.

22. The method of claim 18, wherein the set of beam pairs comprises all of a set of possible beam pairs associated with the second wireless node.

23. The method of claim 18, wherein the set of beam pairs comprises a subset of reception beams of the set of reception beams of the second wireless node, wherein the subset of reception beams is associated with one or more backhaul links of the second wireless node.

24. The method of claim 18, wherein the set of beam pairs comprises a subset of reception beams of the set of reception beams of the second wireless node, wherein the subset of reception beams are candidates for scheduling by the aggressor wireless node.

25. The method of claim 18, wherein the set of beam pairs comprises a subset of reception beams of the set of reception beams of the second wireless node, wherein the subset of reception beams are candidates for scheduling by the first wireless node.

26. The method of claim 18, further comprising:
transmitting a second signal corresponding to a serving transmission beam of the first wireless node, wherein the interfering signal corresponds to a beam different than the serving transmission beam.

27. The method of claim 26, wherein the set of beam pairs excludes the serving transmission beam.

28. An apparatus for wireless communications at a first wireless node in a wireless communications system, comprising:
a processor,
memory coupled with the processor; and
instructions stored in the memory and executable by the processor to cause the apparatus to:
establish a communications link with a second wireless node in the wireless communications system, wherein the second wireless node is a parent node or a child node of the first wireless node;
receive, via a reception beam of the first wireless node, an interfering signal from an aggressor wireless node in the wireless communications system;
perform an interference measurement of the interfering signal at the reception beam to obtain a beam index of a transmission beam associated with the interfering signal, a beam index of the reception beam, or both;
receive, from the second wireless node or the aggressor wireless node, a downlink medium access control (MAC) control element (CE) comprising a request for an interference measurement report from the second wireless node or the aggressor wireless node; and
transmit, in response to the request received in the downlink MAC CE, an uplink MAC CE comprising the interference measurement report indicating the interference measurement for scheduling subsequent communications for the first wireless node and indicating the beam index of the transmission beam associated with the interfering signal, the beam index of the reception beam, or both.

29. An apparatus for wireless communications at a first wireless node in a wireless communications system, comprising:
a processor,
memory coupled with the processor; and
instructions stored in the memory and executable by the processor to cause the apparatus to:
establish a communications link with a second wireless node in the wireless communications system, wherein the second wireless node is in a parent-child relationship with the first wireless node;
transmit, to the second wireless node or an aggressor wireless node, a downlink medium access control (MAC) control element (CE) comprising a request for an interference measurement report;
receive, upon transmitting the request in the downlink MAC CE, an uplink MAC CE comprising the interference measurement report indicating an interference measurement for scheduling subsequent communications for the second wireless node and indicating a beam index of a transmission beam associated with an interfering signal, a beam index of a reception beam of the second wireless node, or both, wherein the interference measurement corresponds to the interfering signal from the aggressor wireless node at the reception beam of the second wireless node; and
schedule the subsequent communications with the second wireless node, the aggressor wireless node, or both based at least in part on receiving the interference measurement report that indicates the interference measurement and indicates the beam index of the transmission beam associated with the interfering signal, the beam index of the reception beam of the second wireless node, or both.

\* \* \* \* \*